US011477841B2

United States Patent
Jia et al.

(10) Patent No.: US 11,477,841 B2
(45) Date of Patent: Oct. 18, 2022

(54) EVENT TRIGGERED NETWORK PARAMETER MANIPULATION

(71) Applicant: AT&T Intellectual Property I, L.P., Atlanta, GA (US)

(72) Inventors: Yupeng Jia, Austin, TX (US); Wen Yang, Bellevue, WA (US); Hongyan Lei, Plano, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 41 days.

(21) Appl. No.: 16/953,396

(22) Filed: Nov. 20, 2020

(65) Prior Publication Data

US 2022/0167456 A1 May 26, 2022

(51) Int. Cl.
*H04W 76/27* (2018.01)
*H04W 76/10* (2018.01)
*H04W 24/10* (2009.01)

(52) U.S. Cl.
CPC .......... *H04W 76/27* (2018.02); *H04W 24/10* (2013.01); *H04W 76/10* (2018.02)

(58) Field of Classification Search
CPC ...... H04W 76/27; H04W 24/10; H04W 76/10
See application file for complete search history.

(56) References Cited

U.S. PATENT DOCUMENTS

| 2019/0394825 A1* | 12/2019 | Byun | H04W 72/042 |
| 2021/0297969 A1* | 9/2021 | Myung | H04W 24/10 |
| 2022/0038162 A1* | 2/2022 | Ranjan | H04W 24/08 |

\* cited by examiner

*Primary Examiner* — Chuong A Ngo
(74) *Attorney, Agent, or Firm* — Hartman & Citrin LLC

(57) ABSTRACT

Event triggered network parameter manipulation can include detecting a trigger to collect data associated with a connection between a user equipment and a cellular network; triggering delivery of a radio resource control message to the user equipment by the cellular network; and receiving, from the user equipment, a report that can include operational data associated with the user equipment. Data from the cellular network can be obtained. The data can include the report and operational data associated with the cellular network. The operational data associated with the cellular network can include connection parameters associated with the connection between the user equipment and the cellular network. The data can be analyzed to determine one of the connection parameters that is to be manipulated, and a command that instructs a recipient of the command to manipulate the one of the connection parameters can be issued.

20 Claims, 9 Drawing Sheets

EVENT TRIGGERED NETWORK PARAMETER MANIPULATION

BACKGROUND

Cellular networks are used across a wide array of geographical conditions, locations, environmental conditions, and the like. Similarly, hardware and technologies used at different network sites may vary widely, and devices used to connect to the networks may also vary widely. Nonetheless, networks generally provide connection parameters for devices based on basic assumptions associated with the network sites and/or users thereof.

The connection parameters typically are geared to accommodate the widest array of devices contemplated for the widest array of needs contemplated. Users or devices that are dissimilar from the contemplated devices and/or needs may not perform optimally as a result. When sub-optimal performance is detected, manual adjustments of configurations may be made. In some cases, a network may broadcast changes to devices that are currently connected to network sites, but the changes broadcast by networks may be based on an automatically selected set of parameters and/or settings that again, are intended to apply to a wide array of devices that may or may not include a particular device.

SUMMARY

The present disclosure is directed to event triggered network parameter manipulation. A user equipment can communicate with one or more entities on a cellular network such as, for example, a radio associated with a cell via a connection that can be controlled by various connection parameters. As used herein, a "network parameter" can refer to a "connection parameter" or other parameter associated with operation of a network and/or a component thereof. Thus, the phrase "network parameter" can include connection parameters as illustrated and described herein. According to various embodiments of the concepts and technologies disclosed herein, the user equipment can receive and/or exchange messages with the cell via the radio resource control (sometimes abbreviated as "RRC") protocol, e.g., by exchanging radio resource control messages. According to various embodiments of the concepts and technologies disclosed herein, the radio resource control messages can include requests for certain operational information and/or other information associated with a user equipment. According to various embodiments of the concepts and technologies disclosed herein, the operational information and/or other information can include, for example, location data associated with the user equipment, temperature data associated with the user equipment, battery data associated with the user equipment, usage data associated with the user equipment, connection data associated with the user equipment, and/or other data.

In response to receiving the radio resource control messages, the user equipment can obtain the requested operational information and/or other information, and provide that information to the requestor (e.g., the cell). The user equipment can provide the information, in some embodiments, in one or more reports. The reports can include the requested operational information and/or other information. In some embodiments, the radio resource control messages also can define a time interval and/or a number of iterations. The user equipment can be configured (e.g., by an application such as the parameter application), to provide the requested operational information and/or other information in one or more reports that can be generated by the user equipment at the specified time intervals and, optionally, for the specified number of iterations (or indefinitely, if so specified). In some embodiments, the cellular network can generate the radio resource control messages in response to a request from a parameter engine or other entity, though this is not necessarily the case.

In response to receiving the reports, or in response to the request, one or more cellular network data sources can provide cellular network data to the parameter engine or a computing device that can host and/or execute the parameter engine. The cellular network data can include various instances and/or types of operational information associated with the cellular network such as, for example, configuration data associated with the cellular network, a cell of the cellular network, and/or other components and/or entities of the cellular network; environmental data associated with the cellular network, a cell of the cellular network, and/or other components and/or entities of the cellular network; signal load data associated with the cellular network, a cell of the cellular network, and/or other components and/or entities of the cellular network; quality of service data associated with the cellular network, a cell of the cellular network, and/or other components and/or entities of the cellular network; event data associated with the cellular network, a cell of the cellular network, and/or other components and/or entities of the cellular network; the contents of one or more of the reports; and/or other data.

The parameter engine can analyze the cellular network data, including the current connection parameters being used for communications between the user equipment and the cellular network, and determine if any of the connection parameters should be manipulated. In some embodiments, the analysis of the cellular network data also can include analysis of usage models that can define how the user equipment and/or the cellular network are used. In some embodiments, the connection parameters can be manipulated based on needs of the user equipment. In some other embodiments, the connection parameters can be manipulated based on needs of the cellular network. In some other embodiments, the connection parameters can be manipulated based on needs of the user equipment and the cellular network.

The parameter engine can determine what connection parameters are to be manipulated and generate commands that, when received by one or more devices, cause the one or more devices to manipulate the connection parameters, thereby adjusting various aspects of one or more connections between the user equipment and the cellular network. According to various embodiments of the concepts and technologies disclosed herein, these manipulations to the connections can occur without user knowledge and/or network operator intervention. Also, because the needs of the cellular network and the devices connecting to the network can change frequently, embodiments of the concepts and technologies disclosed herein can enable dynamic adjustment of connection parameters without user intervention or knowledge and/or without network operator knowledge or intervention. The parameter engine can trigger delivery of the commands to the devices associated with the cellular network and/or the user equipment for use in association with one or more of the connections. The parameter engine also can perform reporting and learning functions based on the manipulation of the connection parameters. In particular, the parameter engine can update usage models based on the manipulation of the connection parameters and/or report the manipulation of the connection parameters to various entities.

According to one aspect of the concepts and technologies disclosed herein, a system is disclosed. The system can include a processor and a memory. The memory can store computer-executable instructions that, when executed by the processor, cause the processor to perform operations. The operations can include detecting a trigger to collect data associated with a connection between a user equipment and a cellular network; triggering delivery of a radio resource control message to the user equipment by the cellular network; and receiving, from the user equipment, a report that is generated by the user equipment in response to receiving the radio resource control message. The report can include operational data associated with the user equipment. The operations further can include obtaining data from the cellular network. The data from the cellular network can include the report and operational data associated with the cellular network. The operational data associated with the cellular network can include connection parameters associated with the connection between the user equipment and the cellular network. The operations further can include analyzing the data to determine one of the connection parameters that is to be manipulated; and issuing a command that instructs a recipient of the command to manipulate the one of the connection parameters.

In some embodiments, detecting the trigger can include receiving a request from a parameter engine. In some embodiments, detecting the trigger can include detecting establishment of the connection between the user equipment and the cellular network. In some embodiments, the data from the cellular network can include signal load data associated with a cell that supports the connection between the user equipment and the cellular network and the report.

In some embodiments, the report can include battery data that defines battery capacity of the user equipment; temperature data that defines a temperature associated with the user equipment; and connection data that defines a communication need associated with the user equipment. In some embodiments, the radio resource control message can include a request for the operational data associated with the user equipment. In some embodiments, analyzing the data to determine one of the connection parameters that is to be manipulated further can include obtaining a usage model associated with the user equipment, where the usage model can indicate a history of usage of the user equipment; and analyzing the data and the usage model to determine one of the connection parameters that is to be manipulated.

According to another aspect of the concepts and technologies disclosed herein, a method is disclosed. The method can include detecting, at a computing device including a processor, a trigger to collect data associated with a connection between a user equipment and a cellular network; triggering, by the processor, delivery of a radio resource control message to the user equipment by the cellular network; and receiving, by the processor and from the user equipment, a report that is generated by the user equipment in response to receiving the radio resource control message. The report can include operational data associated with the user equipment. The method further can include obtaining, by the processor, data from the cellular network. The data from the cellular network can include the report and operational data associated with the cellular network. The operational data associated with the cellular network can include connection parameters associated with the connection between the user equipment and the cellular network. The method further can include analyzing, by the processor, the data to determine one of the connection parameters that is to be manipulated; and issuing, by the processor, a command that instructs a recipient of the command to manipulate the one of the connection parameters.

In some embodiments, detecting the trigger can include receiving a request from a parameter engine. In some embodiments, detecting the trigger can include detecting establishment of the connection between the user equipment and the cellular network. In some embodiments, the data from the cellular network can include signal load data associated with a cell that supports the connection between the user equipment and the cellular network and the report.

In some embodiments, the report can include battery data that defines battery capacity of the user equipment; temperature data that defines a temperature associated with the user equipment; and connection data that defines a communication need associated with the user equipment. In some embodiments, the radio resource control message can include a request for the operational data associated with the user equipment. In some embodiments, analyzing the data to determine one of the connection parameters that is to be manipulated further can include obtaining a usage model associated with the user equipment, where the usage model can indicate a history of usage of the user equipment; and analyzing the data and the usage model to determine one of the connection parameters that is to be manipulated.

According to yet another aspect of the concepts and technologies disclosed herein, a computer storage medium is disclosed. The computer storage medium can store computer-executable instructions that, when executed by a processor, cause the processor to perform operations. The operations can include detecting a trigger to collect data associated with a connection between a user equipment and a cellular network; triggering delivery of a radio resource control message to the user equipment by the cellular network; and receiving, from the user equipment, a report that is generated by the user equipment in response to receiving the radio resource control message. The report can include operational data associated with the user equipment. The operations further can include obtaining data from the cellular network. The data from the cellular network can include the report and operational data associated with the cellular network. The operational data associated with the cellular network can include connection parameters associated with the connection between the user equipment and the cellular network. The operations further can include analyzing the data to determine one of the connection parameters that is to be manipulated; and issuing a command that instructs a recipient of the command to manipulate the one of the connection parameters.

In some embodiments, detecting the trigger can include receiving a request from a parameter engine. In some embodiments, detecting the trigger can include detecting establishment of the connection between the user equipment and the cellular network. In some embodiments, the data from the cellular network can include signal load data associated with a cell that supports the connection between the user equipment and the cellular network and the report.

In some embodiments, the report can include battery data that defines battery capacity of the user equipment; temperature data that defines a temperature associated with the user equipment; and connection data that defines a communication need associated with the user equipment. In some embodiments, the radio resource control message can include a request for the operational data associated with the user equipment. In some embodiments, analyzing the data to determine one of the connection parameters that is to be manipulated further can include obtaining a usage model associated with the user equipment, where the usage model can indicate a history of usage of the user equipment; and analyzing the data and the usage model to determine one of the connection parameters that is to be manipulated.

Other systems, methods, and/or computer program products according to embodiments will be or become apparent to one with skill in the art upon review of the following drawings and detailed description. It is intended that all such additional systems, methods, and/or computer program products be included within this description, and be within the scope of this disclosure.

DETAILED DESCRIPTION

Figure 1:
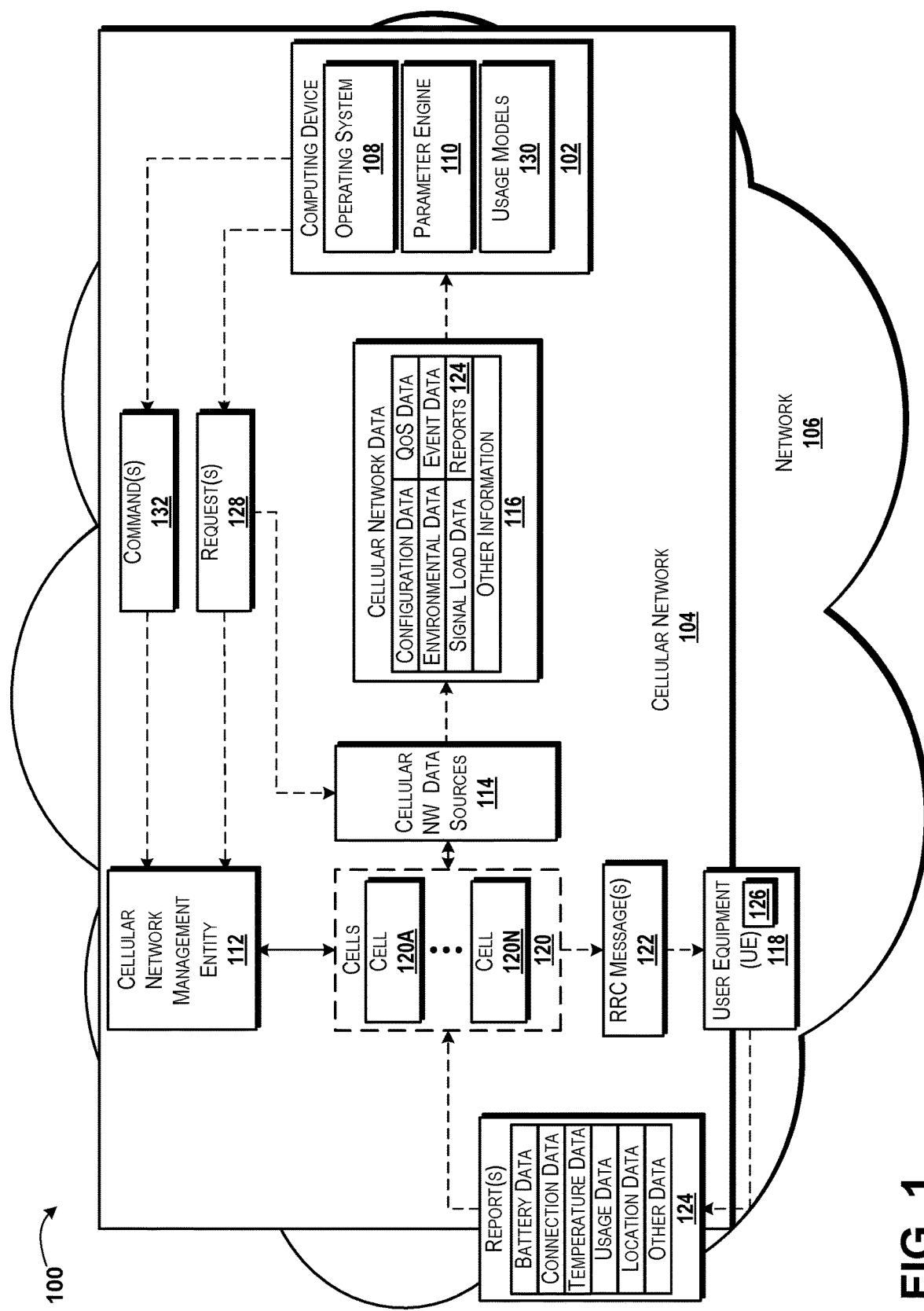
FIG. 1 is a system diagram illustrating an illustrative operating environment for various embodiments of the concepts and technologies described herein.

The following detailed description is directed to event triggered network parameter manipulation. A user equipment can communicate with one or more entities on a cellular network such as, for example, a radio associated with a cell via a connection that can be controlled by various connection parameters. According to various embodiments of the concepts and technologies disclosed herein, the user equipment can receive and/or exchange messages with the cell via the radio resource control protocol, e.g., by exchanging radio resource control messages. According to various embodiments of the concepts and technologies disclosed herein, the radio resource control messages can include requests for certain operational information and/or other information associated with the user equipment. According to various embodiments of the concepts and technologies disclosed herein, the operational information and/or other information can include, for example, location data associated with the user equipment, temperature data associated with the user equipment, battery data associated with the user equipment, usage data associated with the user equipment, connection data associated with the user equipment, and/or other data.

In response to receiving the radio resource control messages, the user equipment can obtain the requested operational information and/or other information, and provide that information to the requestor (e.g., the cell) in one or more reports, where the reports can include the requested operational information and/or other information. In some embodiments, the radio resource control messages also can define a time interval and/or a number of iterations. The user equipment can be configured (e.g., by an application such as the parameter application), to provide the requested operational information and/or other information in one or more reports that can be generated by the user equipment at the specified time intervals, and optionally for the specified number of iterations (or indefinitely, if so specified). In some embodiments, the cellular network can generate the radio resource control messages in response to a request from a parameter engine or other entity, though this is not necessarily the case.

In response to receiving the reports, or in response to the request, one or more cellular network data sources can provide cellular network data to the parameter engine or a computing device that hosts and/or executes the parameter engine. The cellular network data can include various operational information associated with the cellular network such as, for example, configuration data associated with the cellular network, a cell of the cellular network, and/or other components and/or entities of the cellular network; environmental data associated with the cellular network, a cell of the cellular network, and/or other components and/or entities of the cellular network; signal load data associated with the cellular network, a cell of the cellular network, and/or other components and/or entities of the cellular network; quality of service data associated with the cellular network, a cell of the cellular network, and/or other components and/or entities of the cellular network; event data associated with the cellular network, a cell of the cellular network, and/or other components and/or entities of the cellular network; the contents of one or more of the reports; and/or other data.

The parameter engine can analyze the cellular network data, including the current connection parameters being used for communications between the user equipment and the cellular network, and determine if any of the connection parameters should be manipulated. In some embodiments, the analysis of the cellular network data also can include analysis of usage models that can define how the user equipment and/or the cellular network are used. In some embodiments, the connection parameters can be manipulated based on needs of the user equipment. In some other embodiments, the connection parameters can be manipulated based on needs of the cellular network. In some other embodiments, the connection parameters can be manipulated based on needs of the user equipment and the cellular network.

The parameter engine can determine what connection parameters are to be manipulated, and generate commands that, when received by one or more devices, cause the devices to manipulate the connection parameters, thereby adjusting various aspects of one or more connections between the user equipment and the cellular network. The parameter engine can trigger delivery of the commands to the devices associated with the cellular network and/or the user equipment for use in the connections. The parameter engine also can perform reporting and learning functions based on the manipulation of the connection parameters. In particular, the parameter engine can update usage models based on the manipulation of the connection parameters and/or report the manipulation of the connection parameters to various entities.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Referring now to FIG. 1, aspects of an operating environment 100 for various embodiments of the concepts and technologies disclosed herein for event triggered network parameter manipulation will be described, according to an illustrative embodiment. The operating environment 100 shown in FIG. 1 can include a computing device 102. The computing device 102 can operate in communication with and/or as a part of a cellular network 104 and/or one or more other communications networks (hereinafter referred to simply as a "network") 106. Thus, it can be appreciated with reference to FIG. 1 that the network 106 can include the cellular network 104 and/or a portion thereof. Furthermore, while the computing device 102 is illustrated as operating on the cellular network 104, it should be understood that in some embodiments of the concepts and technologies disclosed herein, the computing device 102 can operate on the network 106 and communicate with one or more devices on the cellular network 104 and/or the network 106. As such, the illustrated embodiment should not be construed as being limiting in any way.

According to various embodiments, the functionality of the computing device 102 may be provided by one or more server computers, desktop computers, mobile telephones, laptop computers, network computing devices, other computing systems, or the like. It should be understood that the functionality of the computing device 102 can be provided by a single device, by two or more similar devices, and/or by two or more dissimilar devices. For purposes of describing the concepts and technologies disclosed herein, the computing device 102 is described herein as a server computer. It should be understood that this embodiment is illustrative, and should not be construed as being limiting in any way.

The computing device 102 can execute an operating system 108 and one or more application programs such as, for example, a parameter engine 110. The operating system 108 can include a computer program for controlling the operation of the computing device 102. The parameter engine 110 can include an executable program that can be configured to execute on top of the operating system 108 to provide various functions as illustrated and described herein for providing event triggered network parameter manipulation. In some embodiments of the concepts and technologies disclosed herein, the computing device 102 can communicate with a cellular network management entity 112 and/or other device or functionality for controlling communications of part of the cellular network 104. In some other embodiments, the computing device 102 can operate as the cellular network management entity 112 illustrated and described herein. As such, while the computing device 102 and the cellular network management entity 112 are illustrated as two separate entities in FIG. 1, it should be understood that these two entities can be combined into a single device in some embodiments. As such, the illustrated embodiment should not be construed as being limiting in any way.

The parameter engine 110 can be configured to obtain one or more instances of information from one or more cellular network data sources 114 that can be included as part of and/or can be associated with a cellular network 104. This information (hereinafter referred to as cellular network data 116) can be obtained from various entities on the cellular network 104 and/or from the cellular network data sources 114 at various times and can include various types of information and/or data. The cellular network data sources 114 can obtain the information from monitoring and/or reporting mechanisms associated with the cellular network 104 and/or based on communications with one or more user equipment ("UE") 118. Before continuing the description of the cellular network data 116 and/or the cellular network data sources 114, the communications with the user equipment 118 by the cellular network 104 will be explained.

In particular, the user equipment 118 can include various types of devices such as, for example, mobile phones, smartphones, tablet devices, laptop devices, desktop devices, and/or other user devices. According to various embodiments of the concepts and technologies disclosed herein, the user equipment 118 can be cellular-enabled and can communicate with one or more cells 120A-N (hereinafter collectively and/or generically referred to as "cells 120") of the cellular network 104. It can be appreciated that a "cell 120" of a cellular network 104 can more accurately be described as equipment that can provide functionality associated with a cell 120 such as, for example, radio equipment (e.g., base transceiver stations ("BTSs"), NodeBs, eNodeBs, HeNBs, gNBs, ng-eNBs, antennas, and/or other equipment that can provide communications associated with the cell 120). As such, when the present disclosure refers to "connecting to" a cell 120, "communicating with" a cell 120, or the like, it must be understood that the disclosure is referring to a connection to and/or other communication with one or more entities, components, and/or other types of equipment associated with a cell 120.

According to various embodiments the user equipment 118 can connect to and/or operate on the cellular network 104 by registering with the cells 120 or otherwise being recognized as an authorized device by the cellular network 104. According to various embodiments of the concepts and technologies disclosed herein, the user equipment 118 can exchange, with one or more of the cells 120, one or more radio resource control messages 122 (labeled "RRC Messages 122" in FIG. 1) and/or other communications between the user equipment 118 and the cellular network 104. According to various embodiments, the user equipment 118 can generate one or more reports 124 in response to receiving one or more of the radio resource control messages 122 from the cellular network 104.

In various embodiments, the radio resource control messages 122 may be received by the user equipment 118 during establishment of connections between the user equipment 118 and one or more cell 120 of the cellular network 104, during release of the connection between the user equipment 118 and one or more cell 120 of the cellular network 104, during establishment of a radio bearer for the connection between the user equipment 118 and one or more cell 120 of the cellular network 104, and/or at other times (e.g., during or upon one or more of paging notification, paging release, outer loop power control, provisioning, combinations thereof, or the like). According to various embodiments of the concepts and technologies disclosed herein, the user equipment 118 can be configured to provide the reports 124 illustrated and described herein by execution of an executable application such as a parameter application 126. The parameter application 126 can be configured to cause the user equipment 118 to recognize, in one or more radio resource control messages 122, a request for information from the user equipment 118, and to provide, to the one or more cell 120 of the cellular network 104 that sent the radio resource control message 122, one or more of the reports 124. Because the reports 124 can be generated at additional and/or alternative times, it should be understood that these examples are illustrative, and therefore should not be construed as being limiting in any way.

According to various embodiments of the concepts and technologies disclosed herein, the reports 124 can include various measurements and/or metrics that can be measured at the user equipment 118. Some embodiments of measurements and/or metrics that can be included in the reports 124 can include, for example, battery data, connection data, temperature data, usage data, location data, and/or other data. The battery data can include, for example, values and/or functions that can represent battery information including, but not limited to, a total theoretical (e.g., assuming full charge) battery capacity for the battery or batteries of the user equipment 118; a current (e.g., remaining) battery capacity for the battery or batteries of the user equipment 118; a total theoretical (e.g., assuming a full charge) amount of battery power that exists in the battery or batteries of the user equipment 118; a current (e.g., remaining) battery capacity for the battery or batteries of the user equipment 118; and the like.

It can be appreciated that the battery data can be expressed in absolute terms (e.g., remaining capacity as expressed in one or more of milliwatt hours (mWh), milliamp hours (mAh), other measures, combinations thereof, or the like); percentages (e.g., remaining capacity as a percentage of original capacity, theoretical maximum capacity or other amount); current battery state (e.g., charging, discharging, rate of charging, rate of discharging, rate of use, combinations thereof, or the like); and/or other measures. Thus, the battery data can be included to determine an amount of battery power that exists or is available for the user equipment 118. It should be understood that the above examples of battery data are illustrative, and therefore should not be construed as being limiting in any way. As will be explained in more detail hereinbelow, the battery data can be used to determine if any connection parameters should be adjusted. These and other features of embodiments of the concepts and technologies disclosed herein will be explained in more detail below.

The connection data can define various aspects of one or more connections (e.g., data connections) associated with the user equipment 118. Thus, the connection data can capture and define the existence of one or more data and/or voice connections between the user equipment 118 and the cellular network 104, as well as various aspects of those connections such as signal strength, available upstream bandwidth, available downstream bandwidth, uplink speed, downlink speed, latency, jitter, combinations thereof, or the like. As such, the connection data can be used to determine one or more connections that can exist between the user equipment 118 and the cellular network 104, as well as speed of the connections, bandwidth of the connections, latency of the connections, jitter of the connections, voice quality of the connections, and/or other aspects of the connections. As will be explained in more detail hereinbelow, the connection data also can be used to determine if any connection parameters should be adjusted. These and other features of embodiments of the concepts and technologies disclosed herein will be explained in more detail below.

The temperature data can reflect one or more temperatures at or associated with the user equipment 118, at or associated with a component of the user equipment 118, and/or at or associated with an ambient environment associated with the user equipment 118. Thus, the temperature data can reflect an air temperature at the user equipment 118; a device temperature measured at some point within or on the user equipment 118; a temperature measured at some component (e.g., a battery, processor, memory, or other device) of the user equipment 118; combinations thereof; or the like. The temperature data therefore can represent weather at or near the user equipment 118, operating and/or device temperatures at the user equipment 118 and/or of various components of the user equipment 118, other ambient operating conditions at or near the user equipment 118, combinations thereof, or the like. As will be explained in more detail hereinbelow, the temperature data also can be used to determine if any connection parameters should be adjusted. These and other features of embodiments of the concepts and technologies disclosed herein will be explained in more detail below.

The usage data can represent, for example, one or more resource usage characteristics associated with the user equipment 118. Thus, the usage data can capture and/or describe, for example, how the connections between the user equipment 118 and the cellular network 104 are being used by the user equipment 118. Thus, for example, the usage data can define how much of a connection (e.g., as defined by the connection data capacity) is being used. Therefore, it can be appreciated that the usage data can represent bandwidth usage, data usage, and the like. The usage data also can capture and/or describe how the battery or batteries of the user equipment 118 (e.g., as defined by the battery data) are being used. Therefore, the usage data can represent battery usage, battery usage rate, and the like. The usage data also can capture and/or define usage of resources at the user equipment 118 such as, for example, processor usage, memory usage, combinations thereof, or the like. The usage data can capture any resources being used at or by the user equipment 118. As will be explained in more detail hereinbelow, the usage data also can be used to determine if any connection parameters should be adjusted. These and other features of embodiments of the concepts and technologies disclosed herein will be explained in more detail below.

The location data can represent, for example, a past, current, and/or expected future geographic location associated with the user equipment 118. The location data can be expressed in various levels of granularity including, for example, a region, state, county, city, ZIP code, or GPS coordinates. Thus, the location data can be used to determine geographic location at varying levels of accuracy for various purposes. The location data can be used to measure and/or predict resource availability and/or usage associated with the user equipment 118 and some past, present, or future time. As will be explained in more detail hereinbelow, the usage data also can be used to determine if any connection parameters should be adjusted. These and other features of embodiments of the concepts and technologies disclosed herein will be explained in more detail below.

The other data (of the reports 124) can include, but is not limited to, users associated with the user equipment 118, device information (e.g., model information, capability information, etc.), identifying information associated with the user equipment 118 (e.g., an international mobile equipment identity ("IMEI"), serial number, or other identifying information), combinations thereof, or the like. The other data also can represent handoff information, historical usage information, and/or other information associated with the user equipment 118 and/or one or more users thereof. The other data also can represent operations and/or applications running at the user equipment 118, or other resource usage information associated with the user equipment 118. The other data can be used to associate various other aspects of the reports 124 with the user equipment 118 and/or for other purposes.

According to various embodiments, the other data also can include the connection parameters that are being used by the cellular network 104 to communicate with the user equipment 118. Thus, it can be appreciated that the recipient of the cellular network data 116 can determine the existing connection parameters (that may be manipulated according to various embodiments of the concepts and technologies disclosed herein) from the cellular network data 116. In various embodiments, the connection parameters can include parameters used by various entities of the cellular network 104 and/or the user equipment 118 to control how the connection between the user equipment 118 and the cellular network 104 operates.

The connection parameters can control, for example, transmission power of the connection between the user equipment 118 and the cellular network 104, signal power of the connection between the user equipment 118 and the cellular network 104, frequency of the connection between the user equipment 118 and the cellular network 104, IP address of the connection between the user equipment 118 and the cellular network 104, communication protocol of the connection between the user equipment 118 and the cellular network 104, uplink speed of the connection between the user equipment 118 and the cellular network 104, downlink speed of the connection between the user equipment 118 and the cellular network 104, bandwidth usage of the connection between the user equipment 118 and the cellular network 104, and/or other aspects of the connection between the user equipment 118 and the cellular network 104. As will be explained in more detail hereinbelow, the other data also can be used to determine if any connection parameters should be adjusted. These and other features of embodiments of the concepts and technologies disclosed herein will be explained in more detail below.

Returning now to the description of the cellular network data 116, the one or more cellular network data sources 114 can include various data sources such as, for example, network monitors, signaling monitors, radio controllers, signaling controllers, databases, data structures, and/or other network elements for collecting network usage, performance, and/or other information associated with the cellular network 104. The cellular network data sources 114 can be configured to collect these and/or other information associated with the cells 120 of the cellular network 104. Thus, the cellular network data sources 114 can include one or more data structures that can collect data associated with the cellular network 104; one or more monitoring, control, and/or reporting devices and/or mechanisms associated with the cellular network 104; location servers and/or other sources of geolocation information; weather data sources, internal and/or external data sources associated with the cellular network 104 and/or components thereof; network usage and/or performance data sources; and/or other data sources.

The cellular network data sources 114 also can include reporting and/or event sources that can report events and/or event data. One or more of the cellular network data sources 114 also can be configured to track input for the cellular network 104 and/or one or more components thereof. Because the cellular network data 116 can be obtained from additional and/or alternative cellular network data sources 114, it should be understood that the above examples are illustrative and therefore should not be construed as being limiting in any way.

As illustrated in FIG. 1, and as can be appreciated with reference to the various contemplated cellular network data sources 114 described herein, the illustrated cellular network data 116 can include, for example, configuration data, environmental data, signal load data, quality of service data, event data, the reports 124, and/or other information. According to various embodiments of the concepts and technologies disclosed herein, the configuration data can include static and/or dynamic configuration information associated with the cellular network 104 and/or one or more devices communicating with the cellular network 104.

Thus, in various embodiments the configuration data can include, for example, numerical and categorical parameters including, but not limited to, one or more frequency or frequencies used by the user equipment 118 connecting to a particular cell 120, one or more signal power measures associated with a connection used by the user equipment 118 connecting to a particular cell 120, one or more gain measures associated with a connection used by the user equipment 118 connecting to a particular cell 120, a propagation model associated with a particular cell 120 and/or one or more components thereof, combinations thereof, or the like. As will be explained in more detail hereinbelow, the configuration data can be used to determine if any connection parameters should be adjusted. These and other features of embodiments of the concepts and technologies disclosed herein will be explained in more detail below.

The environmental data can represent weather at or near one or more of the cells 120 and/or one or more components thereof, as well as other environmental conditions at or near one or more of the cells 120 to which the user equipment 118 is connected. The environmental conditions can include, for example, ambient temperatures, weather conditions, humidity levels, radiofrequency ("RF") noise levels, and/or other conditions at or near one or more of the cells 120. Thus, the environmental data can describe conditions at the cells 120 communicated with by the user equipment 118. As will be explained in more detail hereinbelow, the environmental data can be used to determine if any connection parameters should be adjusted. These and other features of embodiments of the concepts and technologies disclosed herein will be explained in more detail below.

The signal load data can represent, for example, a signal load associated with the cell 120 to which the user equipment 118 is connected. The signal load data can include, for example, a percentage or other amount of signal spectrum and/or bandwidth being consumed for a particular cell 120 at some time, as perceived or measured by the cell 120 and/or one or more other entity or entities associated with the cellular network 104. As will be explained in more detail hereinbelow, the signal load data can be used to determine if any connection parameters should be adjusted. These and other features of embodiments of the concepts and technologies disclosed herein will be explained in more detail below.

The quality of service data can represent, for example, one or more performance characteristics associated with a connection between the user equipment 118 and one or more of the cells 120. The quality of service data can include, for example, a transmission power associated with the user equipment 118 and/or the cell 120, a perceived or measured received signal power associated with the user equipment 118 and/or the cell 120, perceived or measured received signal quality ("RSQ") or other KPIs associated with the connection used by the user equipment 118, uplink and/or downlink speed associated with the connection used by the user equipment 118 to connect to the cell 120, latency or jitter associated with the connection used by the user equipment 118 to connect to the cell 120, combinations thereof, or the like.

Thus, the quality of service data can capture and/or define various aspects of the connection used by the user equipment 118 as determined at the cell 120 or other component of the cellular network 104. It should be understood that these examples are illustrative, and therefore should not be construed as being limiting in any way. As will be explained in more detail hereinbelow, the quality of service data can be used to determine if any connection parameters should be adjusted. These and other features of embodiments of the concepts and technologies disclosed herein will be explained in more detail below.

The event data can include data that can reflect one or more events associated with the user equipment 118 and/or one or more of the cells 120. The events can include, for example, failures and/or repairs associated with the one or more cells 120. The events also can include device attachments and/or registrations (e.g., each time the user equipment 118 attaches to the cellular network 104, each time the user equipment 118 is handed off from one cell 120 to another cell 120, each time the user equipment 118 registers with the cellular network 104, combinations thereof, or the like).

Thus, the event data can capture network events associated with the user equipment 118 such as the user equipment 118 connecting to the cellular network 104, disconnecting from the cellular network 104, being handed off among cells 120 of the cellular network 104, and/or other changes to network state associated with the user equipment 118. As will be explained in more detail hereinbelow, the event data can be used to determine if any connection parameters should be adjusted. These and other features of embodiments of the concepts and technologies disclosed herein will be explained in more detail below.

The reports 124 are described in more detail herein. The cellular network data 116 can include the reports 124 and/or portions thereof, and therefore can capture information provided by the user equipment 118. Thus, it can be appreciated that the cellular network data 116 can represent various aspects of the user equipment 118 and/or the connections between the user equipment 118 and the cellular network 104 as captured by the user equipment 118 and/or the cellular network 104.

The other information can include, but is not limited to, data that can indicate the geographic location and/or position of one or more cells 120 and/or one or more components thereof, computation and/or storage capacities of servers associated with a particular cell 120 and/or one or more components thereof, cell-loads associated with a particular cell 120 and/or one or more components thereof, and/or information from external sources such as ZIP codes associated with a particular cell 120, weather associated with a particular cell 120, and/or other information associated with a particular cell 120 and/or one or more components thereof. As will be explained in more detail hereinbelow, the other information can be used to determine if any connection parameters should be adjusted. These and other features of embodiments of the concepts and technologies disclosed herein will be explained in more detail below.

The parameter engine 110 can obtain the cellular network data 116 at various times and can use the cellular network data 116 to determine if one or more connection parameters used by the user equipment 118 and/or the cellular network 104 to communicate with one another should be modified. According to various embodiments of the concepts and technologies disclosed herein, the cellular network data 116 can be obtained by the parameter engine 110 in response to requesting the cellular network data 116 from the cellular network 104.

In some embodiments, for example, the parameter engine 110 can generate one or more request(s) 128 that, when received by the cellular network management entity 112 and/or other entity associated with the cellular network 104, can prompt the cellular network 104 and/or the cellular network data sources 114 to obtain the cellular network data 116 and/or to provide the cellular network data 116 to the parameter engine 110. Thus, in some embodiments of the concepts and technologies disclosed herein, it can be appreciated that in response to receiving the request 128, the cellular network management entity 112 can prompt one or more of the cells 120 to communicate with the user equipment 118 (e.g., via sending one or more radio resource control messages 122 to the user equipment 118) and receiving, in response to the one or more radio resource control messages 122, reports 124 from the user equipment 118. It should be understood that this example is illustrative, and therefore should not be construed as being limiting in any way.

In some other embodiments, the cellular network data sources 114 can be configured to provide the cellular network data 116 to the parameter engine 110 without the cellular network management entity 112 and/or other entity associated with the cellular network 104 receiving the request 128 from the parameter engine 110. For example, the cellular network data sources 114 can be configured to obtain the cellular network data 116 and to provide the cellular network data 116 to the parameter engine 110 at various times and/or upon various trigger events.

According to some embodiments, the trigger events can include, but are not limited to, the user equipment 118 connecting to the cellular network 104, a cell 120 handing off the user equipment 118 to another cell 120, registration of the user equipment 118 with a cell 120 and/or the cellular network 104, initiation of a data session by the user equipment 118, and/or other events. In some other embodiments, the trigger events can include passage of one or more defined time intervals. In some other embodiments, the trigger events can include detecting an operating condition change at the cellular network 104.

The trigger events can include one or more of the above and/or other trigger events. In some embodiments, the request 128 can be received by the cellular network data sources 114. As such, the illustrated embodiment is illustrative. Because the cellular network data 116 can be obtained by the parameter engine 110 at additional and/or alternative times as illustrated and described herein, it should be understood that these examples are illustrative, and therefore should not be construed as being limiting in any way.

The parameter engine 110 can be configured to obtain the cellular network data 116 and to analyze the cellular network data 116. The parameter engine 110 can be configured to determine, based on the analysis of the cellular network data 116, if any connection parameters associated with the connection between the user equipment 118 and the cell 120 to which the user equipment 118 is connected should be manipulated. In particular, the parameter engine 110 can determine, based on the analysis of the cellular network data 116 if one or more network parameters associated with the connection between the user equipment 118 and the cell 120 to which the user equipment 118 is connected should be changed based on the battery data, connection data, temperature data, usage data, location data, other data, configuration data, environmental data, signal load data, quality of service data, event data, and/or other information.

The functionality illustrated and described herein for making this determination will be illustrated and described in more detail below, but briefly the parameter engine 110 can determine, based on the analysis of the cellular network data 116, if the connection parameters associated with the connection between the user equipment 118 and the cell 120 to which the user equipment 118 is connected are optimized based on the conditions at the user equipment 118 and/or based on conditions at the cell 120.

In some other embodiments, the parameter engine 110 can determine, based on the analysis of the cellular network data 116, device needs of the user equipment 118, and can manipulate the connection parameters associated with the connection between the user equipment 118 and the cellular network 104 based on the device needs of the user equipment 118. For example, the parameter engine 110 can determine, based on the analysis of the cellular network data 116, a battery level of the user equipment 118 (e.g., based on the battery data), signaling associated with the user equipment 118, a power consumption rate associated with the user equipment 118, combinations thereof, or the like. The parameter engine 110 can determine, e.g., based on the temperature at or near the user equipment 118 (e.g., based on the temperature data), applications being used (e.g., based on the other data), and/or the connections being used by the user equipment 118 (e.g., based on the connection data and usage data), an amount of battery that is being consumed by the user equipment 118 for various connections (e.g., voice and/or data), amount of signaling that is occurring, combinations thereof, or the like. Based on these determinations, the parameter engine 110 can determine, for example, if a connection parameter associated with one of the connections between the user equipment 118 and the cellular network 104 should be manipulated or otherwise changed to affect the consumption rate of the battery (or batteries) at the user equipment 118, the amount of signaling by the user equipment 118, and/or other aspects of the connection.

In some embodiments, the parameter engine 110 can further base this determination on various aspects of the cellular network 104 such as, for example, a signal load associated with the cellular network 104 (e.g., based on the signal load data), a quality of service of one more connections between the user equipment 118 and the cellular network 104 (e.g., based on the quality of service data), and/or other aspects of the network as illustrated and described herein. Based on these and/or other considerations, the parameter engine 110 can determine whether one or more connection parameters should be manipulated. Additional aspects of the concepts and technologies disclosed herein for manipulating connection parameters will be discussed in more detail below.

In some other embodiments, the parameter engine 110 can determine, based on the analysis of the cellular network data 116, needs of the user equipment 118, and can manipulate the connection parameters associated with the connection between the user equipment 118 and the cellular network 104 based on the needs of the user equipment 118 as determined. For example, the parameter engine 110 can determine that the user equipment 118 has been provided with a certain level of service for a data connection. Meanwhile, the parameter engine 110 can determine, based on the analysis of the cellular network data 116, that a lower quality of service can be used to satisfy the current needs of the user equipment 118 (e.g., the parameter engine 110 may determine that the user equipment 118 has been provisioned with a broadband wireless data connection and is only sending control messages over a control channel). The parameter engine 110 can be configured to manipulate the connection parameters to modify the connection based on a predetermined setting or gradient that matches the needs of the user equipment 118. It should be understood that this example is illustrative, and therefore should not be construed as being limiting in any way.

In some other embodiments, the parameter engine 110 can determine, based on the analysis of the cellular network data 116, needs of the cellular network 104, and can manipulate the connection parameters associated with the connection between the user equipment 118 and the cellular network 104 based on the needs of the cellular network 104. For example, the parameter engine 110 can determine that the user equipment 118 has been provided with a certain level of service for a data connection and that a lower quality of service could be used to satisfy the current needs of the user equipment 118, while other users are experiencing poor quality of service due to a lack of resources.

The parameter engine 110 can be configured to manipulate the connection parameters to modify the connection based on a predetermined setting or gradient that matches the needs of the cellular network 104 and the user equipment 118, while also enabling the cellular network 104 to better satisfy the needs of the other users of the cellular network 104. In some other embodiments, needs of the cellular network 104 can include, for example, load or traffic balancing. It should be understood that this example is illustrative, and therefore should not be construed as being limiting in any way.

In some other embodiments, the parameter engine 110 can determine, based on the analysis of the cellular network data 116, a location of the user equipment 118, and can manipulate the connection parameters associated with the location determined. For example, the parameter engine 110 can determine that the user equipment 118 is approaching a network cell edge and therefore may soon be handed off to another cell 120. The parameter engine 110 can be configured to manipulate the connection parameters to modify the handoff based on various considerations such as, for example, conditions in a neighboring cell to which the user equipment 118 is to be handed off, conditions at the cellular network 104, combinations thereof, or the like. It should be understood that this example is illustrative, and therefore should not be construed as being limiting in any way.

In some other embodiments, the parameter engine 110 also can be configured to create, maintain, and/or analyze one or more usage models 130. The usage models 130 can represent usage of resources associated with the user equipment 118 and/or associated with the cellular network 104. The usage of the resources associated with the user equipment 118 can be based on the cellular network data 116 illustrated and described herein, and therefore the usage models 130 may depict usage of resources at various locations, times, weather conditions, events, temperatures, and/or other aspects of environments and/or connections as illustrated and described herein. According to various embodiments of the concepts and technologies disclosed herein, the parameter engine 110 can analyze the cellular network data 116 and the usage models 130 to determine if any connection parameters should be manipulated. It should be understood that this example is illustrative, and therefore should not be construed as being limiting in any way.

If the parameter engine 110 determines that a connection parameter should be manipulated, the parameter engine 110 can determine how to modify that connection parameter. In some embodiments, for example, the parameter engine 110 can determine, if (and if so, how) a radio associated with a cell 120 should be tuned, if a frequency used by the user equipment 118 and/or the cell 120 should be changed, if a handoff of the user equipment 118 from one cell 120 to another cell 120 should be delayed, if a quality of service associated with a connection used by the user equipment 118 and/or the cell 120 should be changed, if a signal load associated with a connection used by the user equipment 118 and/or the cell 120 should be changed, if a power consumption mode of the user equipment 118 should be changed, combinations thereof, or the like. Based on the determined manipulations, the parameter engine 110 can generate one or more commands 132.

The commands 132 can include instructions that, when received by the cellular network management entity 112 and/or other entities associated with the cellular network 104, can trigger manipulation of the connection parameters being used to support the connection between the user equipment 118 and the cell 120. Thus, the parameter engine 110 can manipulate the connection parameters or trigger other devices to manipulate the connection parameters associated with a connection used by the user equipment 118 and/or the cell 120. It should be understood that this example is illustrative, and therefore should not be construed as being limiting in any way.

According to various embodiments of the concepts and technologies disclosed herein, a user or other entity associated with the user equipment 118 can opt-in at some time to share information associated with the user equipment 118 and/or connections used by the user equipment 118. The opt-in decision associated with the user equipment 118 can be stored, for example, by an entity associated with the cellular network 104 such as, for example, a user database, an account database, or the like. The opt-in decision also can be stored at the user equipment 118 (e.g., by the parameter application 126, by an identity module, and/or elsewhere) and provided, for example, on-demand or when connecting to, authenticating with, or registering with the cellular network 104. Because the opt-in can be stored and/or accessed in additional and/or alternative manners, it should be understood that these examples are illustrative, and therefore should not be construed as being limiting in any way.

In some embodiments, the user or other entity associated with the user equipment 118 can opt-in to share, for example, the reports 124 and/or the cellular network data 116, and/or to enable use of that information by the parameter engine 110 and/or other entities to manipulate connection parameters. Thus, some embodiments of the concepts and technologies disclosed herein are provided in response to a user or other entity opting in to enable connection parameter manipulation. It should be understood that this example is illustrative, and therefore should not be construed as being limiting in any way.

In practice, a user equipment 118 can communicate with one or more entities on a cellular network 104 such as, for example, a radio associated with a cell 120. According to various embodiments of the concepts and technologies disclosed herein, the user equipment 118 can receive and/or exchange messages with the cell 120 via the radio resource control protocol, e.g., by exchanging radio resource control messages 122. According to various embodiments of the concepts and technologies disclosed herein, the radio resource control messages 122 can include requests for certain operational information and/or other information associated with the user equipment 118. According to various embodiments of the concepts and technologies disclosed herein, the operational information and/or other information can include, for example, location data associated with the user equipment 118, temperature data associated with the user equipment 118, battery data associated with the user equipment 118, usage data associated with the user equipment 118, connection data associated with the user equipment 118, and/or other information and/or data.

In response to receiving the radio resource control messages 122, the user equipment 118 can obtain the requested operational information and/or other information, and provide that information to the requestor (e.g., the cell 120) in one or more reports 124, where the reports 124 can include the requested operational information and/or other information. In some embodiments, the radio resource control messages 122 also can define a time interval and/or a number of iterations. The user equipment 118 can be configured (e.g., by an application such as the parameter application 126), to provide the requested operational information and/or other information in one or more reports 124 that can be generated by the user equipment 118 at the specified time intervals and optionally for a specified number of iterations (or indefinitely, if so specified). In some embodiments, the cellular network 104 can generate the radio resource control messages 122 in response to a request 128 from a parameter engine 110 or other entity, though this is not necessarily the case.

In response to receiving the reports 124, or in response to the request 128, one or more cellular network data sources 114 can provide cellular network data 116 to the parameter engine 110 or a computing device 102 that can host and/or can execute the parameter engine 110. The cellular network data 116 can include various operational information associated with the cellular network 104 such as, for example, configuration data associated with the cellular network 104, a cell 120 of the cellular network 104, and/or other components and/or entities of the cellular network 104; environmental data associated with the cellular network 104, a cell 120 of the cellular network 104, and/or other components and/or entities of the cellular network 104; signal load data associated with the cellular network 104, a cell 120 of the cellular network 104, and/or other components and/or entities of the cellular network 104; quality of service data associated with the cellular network 104, a cell 120 of the cellular network 104, and/or other components and/or entities of the cellular network 104; event data associated with the cellular network 104, a cell 120 of the cellular network 104, and/or other components and/or entities of the cellular network 104; the contents of one or more of the reports 124; and/or other data.

The parameter engine 110 can be configured to analyze the cellular network data 116, including the current connection parameters being used for communications between the user equipment 118 and the cellular network 104, and to determine if any of the connection parameters should be manipulated. In some embodiments, the analysis of the cellular network data 116 also can include analysis of usage models 130 that can define how the user equipment 118 and/or the cellular network 104 are used. In some embodiments, the connection parameters can be manipulated based on needs of the user equipment 118. In some other embodiments, the connection parameters can be manipulated based on needs of the cellular network 104. In yet other embodiments, the connection parameters can be manipulated based on needs of the user equipment 118 and the cellular network 104.

The parameter engine 110 can determine what connection parameters are to be manipulated, and generate commands 132 that, when received by one or more devices, can cause the devices to manipulate the connection parameters, thereby adjusting various aspects of one or more connections between the user equipment 118 and the cellular network 104. The parameter engine 110 can trigger delivery of the commands 132 to the devices associated with the cellular network 104 and/or the user equipment 118 for use in association with the connections. The parameter engine 110 also can perform reporting and learning functions based on the manipulation of the connection parameters. In particular, the parameter engine 110 can update usage models 130 based on the manipulation of the connection parameters and/or report the manipulation of the connection parameters to various entities.

FIG. 1 illustrates one computing device 102, one cellular network 104, one network 106, one cellular network management entity 112, and one user equipment 118. It should be understood, however, that various implementations of the operating environment 100 can include zero, one, or more than one computing device 102; one or more than one cellular network 104; zero, one, or more than one network 106; zero, one, or more than one cellular network management entity 112; and/or one or more than one user equipment 118. As such, the illustrated embodiment should be understood as being illustrative, and should not be construed as being limiting in any way.

Figure 2:
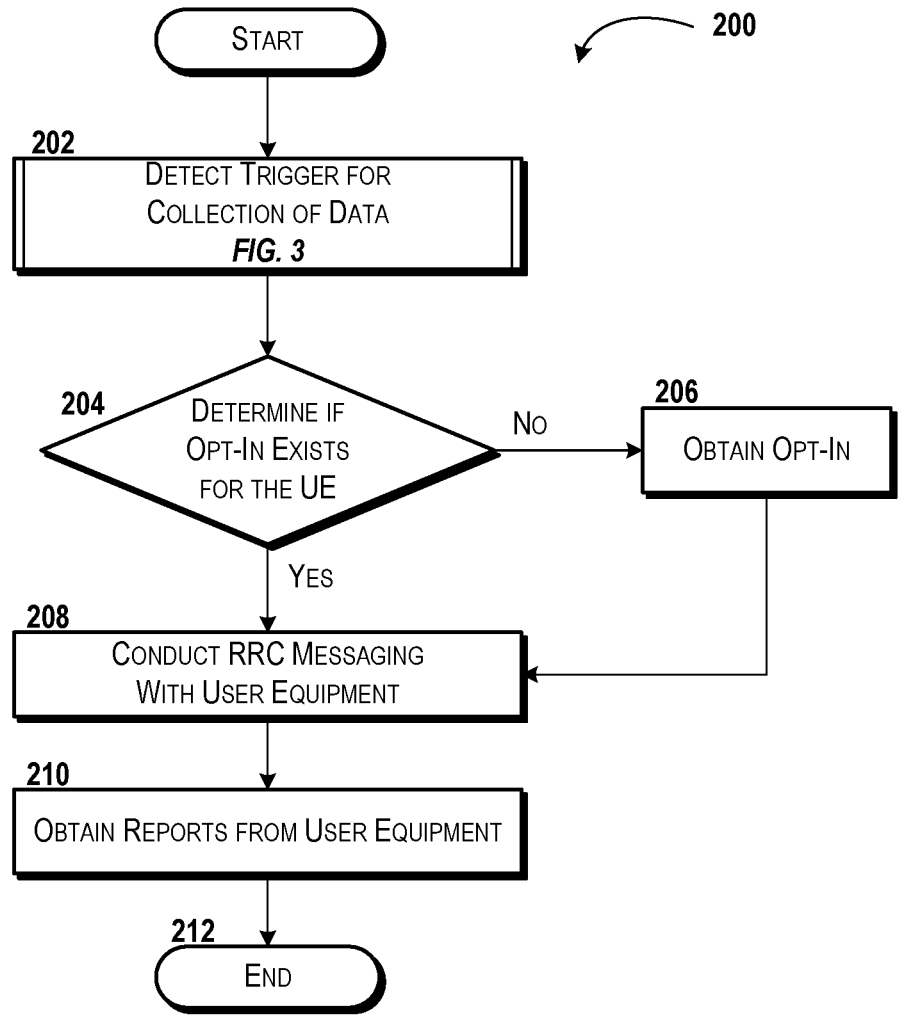
FIG. 2 is a flow diagram showing aspects of a method for obtaining reports from a user equipment, according to an illustrative embodiment of the concepts and technologies described herein.

Turning now to FIG. 2, aspects of a method 200 for obtaining reports 124 from a user equipment 118 will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the computing device 102, the user equipment 118, or other devices, to perform one or more operations and/or causing the processor to direct other components of the computing system or device to perform one or more of the operations.

For purposes of illustrating and describing the concepts of the present disclosure, the method 200 is described herein as being performed by the computing device 102 via execution of one or more software modules such as, for example, the parameter engine 110. In some other embodiments, the cellular network management entity 112 can perform some operations of the method 200, as explained herein (e.g., the functionality of the cellular network management entity 112 can be provided, in some embodiments, by the computing device 102). It should be understood that additional and/or alternative devices and/or network nodes can provide the functionality described herein via execution of one or more modules, applications, and/or other software including, but not limited to, the parameter engine 110. Thus, the illustrated embodiments are illustrative, and should not be viewed as being limiting in any way.

The method 200 begins at operation 202. At operation 202, the computing device 102 can detect a trigger for collection of data. In some embodiments, operation 202 can correspond to the computing device 102 detecting a trigger event for collection of the cellular network data 116 and/or the reports 124 associated with a particular user equipment 118. Additional details of detecting a trigger event by the computing device 102 will be illustrated and described in more detail hereinbelow with reference to FIG. 3. For purposes of illustrating the method 200, it can be appreciated that a trigger event can be detected in operation 202 by the computing device 102.

From operation 202, the method 200 can proceed to operation 204. At operation 204, the computing device 102 can determine if an opt-in exists for the user equipment 118 associated with the trigger event detected in operation 202. As explained above, the opt-in decision can be stored in various places and/or by various entities, so operation 204 can include the computing device 102 accessing one of the entities and/or requesting the opt-in decision from one of the entities. In some embodiments, operation 204 can include the computing device 102 querying the cellular network management entity 112, which can query the user equipment 118 and/or access the opt-in decision from other entities, if desired. Because the opt-in decision can be accessed in additional and/or alternative manners, it should be understood that these examples are illustrative, and therefore should not be construed as being limiting in any way.

If the computing device 102 determines, in operation 204, that the opt-in decision does not exist for the user equipment 118 associated with the trigger event detected in operation 202, the method 200 can proceed to operation 206. At operation 206, the computing device 102 can obtain an opt-in decision from the user equipment 118. In some embodiments of the concepts and technologies disclosed herein, the computing device 102 can prompt one or more other devices to communicate with a user or other entity associated with the user equipment 118 to obtain the opt-in decision. For example, the computing device 102 may prompt one or more other entities to send an alert to the user equipment 118 and/or to otherwise prompt an authorized entity associated with the user equipment 118 to indicate or provide the opt-in decision. For example, the cellular network 104 can trigger delivery of a message or link to the user equipment 118 via which a user or other authorized entity can enter the opt-in decision (e.g., via a text response, via accessing a portal, via sending of an email, combinations thereof, or the like). Because other methods for obtaining the opt-in decision are possible and are contemplated, it should be understood that these examples are illustrative, and therefore should not be construed as being limiting in any way.

If the computing device 102 determines, in operation 204, that the opt-in decision does exist for the user equipment 118 associated with the trigger event detected in operation 202, the method 200 can proceed to operation 208. The method 200 also can proceed to operation 208 from operation 206. At operation 208, the computing device 102 can conduct radio resource control messaging with the user equipment 118, e.g., by sending radio resource control messages 122 to the user equipment 118. According to various embodiments of the concepts and technologies disclosed herein, the radio resource control messages 122 can include multiple parameters such as, for example, "reportUEbattery," "reportUEtemperature," "reportUElocation," other parameters, or the like. Thus, operation 208 can correspond to the computing device 102 triggering the radio resource control messaging with the user equipment 118.

According to various embodiments of the concepts and technologies disclosed herein, the radio resource control messages 122 also can define a time interval that should be used to prompt the user equipment 118 to report the information requested by way of the radio resource control messages 122. In one example embodiment, a radio resource control message 122 can be formatted as set forth below in TABLE 1. It should be understood that this example is merely illustrative of the concepts and technologies disclosed herein, and should not be construed as being limiting in any way.

TABLE 1 message c1 : rrcConnectionReconfiguration :
rrc-TransactionIdentifier 2,
criticalExtensions c1 : rrcConnectionReconfiguration-rxx :
measConfig
reportConfigToAddModList
reportConfigId 7,
reportConfig reportConfigEUTRA :
triggerType periodical:
{

TABLE 1-continued purpose reportUEtemperature
},
reportInterval 30min,
reportAmount infinity
measIdToAddModList
    measId 7,
    measObjectId 1,
    reportConfigId 7

As can be appreciated with reference to the example radio resource control message 122 shown in TABLE 1, the radio resource control message 122 can instruct the user equipment 118 to report its temperature (e.g., via providing the temperature data illustrated and described above with reference to FIG. 1). This example also instructs the user equipment 118 to provide the temperature data (reportUEtemperature) every thirty minutes (reportInterval 30 min) forever until terminated (reportAmount infinity). It should be understood that this example is illustrative, and therefore should not be construed as being limiting in any way. It also can be appreciated that other parameters may be included in the radio resource control message 122 such as, for example, a request for battery data (e.g., reportUEbattery), a request for location data (e.g., reportUElocation), and requests for other types of information illustrated and described herein. It should be understood that this example is illustrative, and therefore should not be construed as being limiting in any way.

From operation 208, the method 200 can proceed to operation 210. At operation 210, the computing device 102 can obtain one or more reports 124 from the user equipment 118 and/or from a device on the cellular network 104 that received the report 124 from the user equipment 118. In particular, in response to receiving the radio resource control message 122 with requests for information as described with reference to operation 208 above, the user equipment 118 can respond with a report 124 that can be sent to the cellular network 104. As noted above, the report 124 and/or portions thereof can be sent to the parameter engine 110 for a decision regarding manipulating one or more connection parameters. It should be understood that this example is illustrative, and therefore should not be construed as being limiting in any way.

From operation 210, the method 200 can proceed to operation 212. The method 200 can end at operation 212.

Figure 3:
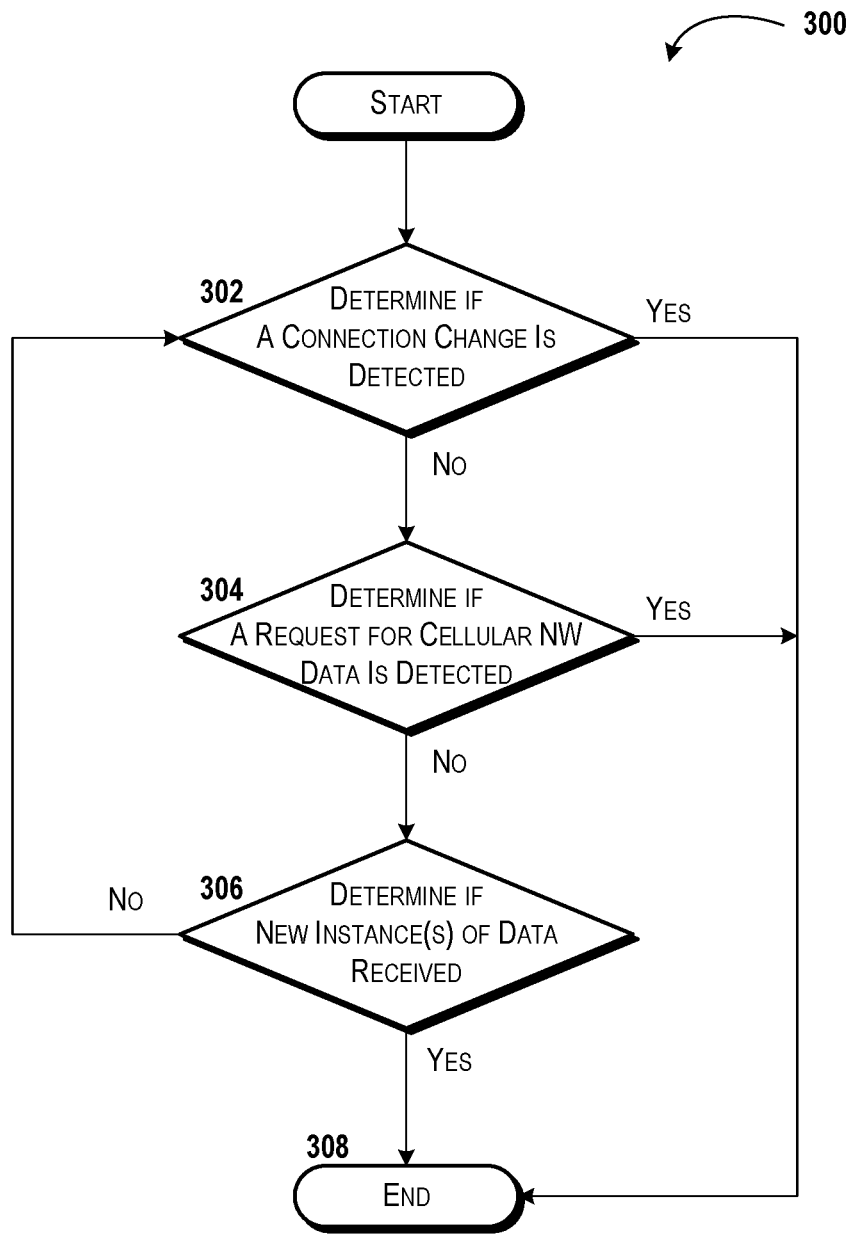
FIG. 3 is a flow diagram showing aspects of a method for detecting a trigger event, according to an illustrative embodiment of the concepts and technologies described herein.

Turning now to FIG. 3, aspects of a method 300 for detecting a trigger event will be described in detail, according to an illustrative embodiment. For purposes of illustrating and describing the concepts of the present disclosure, the method 300 is described herein as being performed by the computing device 102 via execution of one or more software modules such as, for example, the parameter engine 110. In some other embodiments, the cellular network management entity 112 can perform some operations of the method 200, as explained herein (e.g., the functionality of the cellular network management entity 112 can be provided, in some embodiments, by the computing device 102). It should be understood that additional and/or alternative devices and/or network nodes can provide the functionality described herein via execution of one or more modules, applications, and/or other software including, but not limited to, the parameter engine 110. Thus, the illustrated embodiments are illustrative, and should not be viewed as being limiting in any way.

The method 300 begins at operation 302. At operation 302, the computing device 102 can determine if a connection change is detected. In particular, operation 302 can correspond to the computing device 102 or the cellular network management entity 112 determining if a connection between the user equipment 118 and the cellular network 104 (e.g., between the user equipment 118 and a cell 120 of the cellular network 104) has been established, terminated, or changed in any manner. It should be understood that the connection change detected in operation 302 can include a handoff of a connection associated with the user equipment 118 from one cell 120 of the cellular network 104 to another cell 120 of the cellular network 104.

According to various embodiments of the concepts and technologies disclosed herein, the computing device 102, the cellular network management entity 112, and/or other entities of the cellular network 104 can be configured to receive events from one or more elements of the cellular network 104. Thus, operation 302 can correspond to the computing device 102, the cellular network management entity 112, and/or other entities of the cellular network 104 determining that the user equipment 118 has attached to the cellular network 104, dropped a connection to the cellular network 104, and/or made a change to a connection with the cellular network 104. Because a change in a connection between the user equipment 118 and the cellular network 104 can be detected in additional and/or alternative manners, it should be understood that these examples are illustrative, and therefore should not be construed as being limiting in any way.

If the computing device 102 determines, in operation 302, that the connection change has not been detected, the method 300 can proceed to operation 304. At operation 304, the computing device 102 can determine if a request for cellular network data 116 has been received. In particular, operation 304 can correspond to the computing device 102 or the cellular network management entity 112 determining if a request such as the request 128 has been received by an entity associated with the cellular network 104. As noted above, the request 128 can request that the cellular network 104 and/or an entity thereof obtain the cellular network data 116 and provide the cellular network data 116 to the parameter engine 110 or other entity. The cellular network data 116 can describe one or more aspects of a connection between the user equipment 118 and the cellular network 104 (e.g., between the user equipment 118 and a cell 120 of the cellular network 104). Thus, the request 128 detected in operation 304 can describe a connection for which the cellular network data 116 is requested. It should be understood that this example is illustrative, and therefore should not be construed as being limiting in any way.

If the computing device 102 determines, in operation 304, that the request for cellular network data 116 has not been detected, the method 300 can proceed to operation 306. At operation 306, the computing device 102 can determine if a new instance of data (e.g., the cellular network data 116 or a report 124) has been received or generated. In particular, operation 306 can correspond to the computing device 102, the cellular network management entity 112, and/or a cellular network data source 114 determining if a new instance of data such as the cellular network data 116 or the report 124 has been received by any entity associated with the cellular network 104.

Operation 306 can correspond, in some embodiments, to the cellular network 104 receiving, from the user equipment 118, a report 124. For example, as noted above, the user equipment 118 can be configured to provide, at some time interval and/or at other times, a report 124 that can include information that can be requested, for example, in a radio resource control message 122. Thus, operation 306 can correspond to the user equipment 118 providing an updated report when such a time interval expires and/or at other times. It should be understood that this example is illustrative, and therefore should not be construed as being limiting in any way.

Operation 306 also can correspond, in some other embodiments, to the cellular network 104 determining that an updated version of the cellular network data 116 has been, or can be, generated. The cellular network 104 (e.g., the cellular network data source 114, the cellular network management entity 112, and/or the computing device 102) can determine that an updated version of the cellular network data 116 has been, or can be, generated in response to determining that some state or operational characteristic has changed since a last instance of the cellular network data 116 was provided. This can occur, for example, when environmental conditions change, when signal load changes, when configuration changes, when quality of service changes, when events occur, when a new report 124 is received, and/or at other times. It should be understood that this example is illustrative, and therefore should not be construed as being limiting in any way.

As noted above, a request 128 can request that the cellular network 104 and/or an entity thereof obtain the cellular network data 116 and provide the cellular network data 116 to the parameter engine 110 or other entity. In some embodiments, this request 128 also can have a specified time interval. As such, operation 306 also can correspond to the time interval associated with the request 128 expiring, and the cellular network data 116 being obtained by one or more entities in response to detecting the expiration of this time interval associated with the request 128. It should be understood that this example is illustrative, and therefore should not be construed as being limiting in any way.

If the computing device 102 determines, in operation 306, that the connection change has not been detected, the method 300 can return to operation 302, and operations 302-308 can be iterated until the computing device 102 (or other device) determines, in any iteration of operations 302-306, that a connection change, request for cellular network data 116, and/or a new instance of data has been detected.

If the computing device 102 determines, in operation 306, that the connection change has been detected, the method 300 can proceed to operation 308. The method 300 also can proceed to operation 308 if the computing device 102 (or other device) determines, in operation 304, that the request for cellular network data 116 has been detected. The method 300 also can proceed to operation 308 if the computing device 102 (or other device) determines, in operation 302, that the connection change has been detected. The method 300 can end at operation 308.

Figure 4:
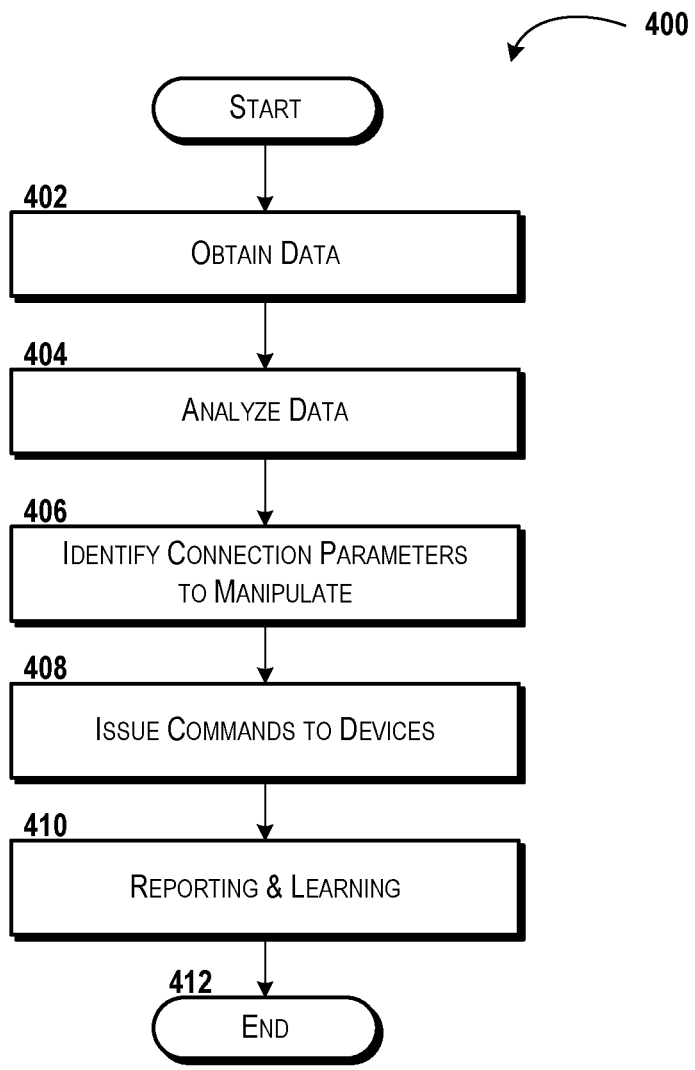
FIG. 4 is a flow diagram showing aspects of a method for adjusting connection parameters, according to an illustrative embodiment of the concepts and technologies described herein.

Turning now to FIG. 4, aspects of a method 400 for adjusting connection parameters will be described in detail, according to an illustrative embodiment. For purposes of illustrating and describing the concepts of the present disclosure, the method 400 is described herein as being performed by the computing device 102 via execution of one or more software modules such as, for example, the parameter engine 110. It should be understood that additional and/or alternative devices and/or network nodes can provide the functionality described herein via execution of one or more modules, applications, and/or other software including, but not limited to, the parameter engine 110. Thus, the illustrated embodiments are illustrative, and should not be viewed as being limiting in any way.

The method 400 begins at operation 402. At operation 402, the computing device 102 can obtain data. In some embodiments of operation 402, the computing device 102 can obtain cellular network data 116. In some other embodiments of operation 402, the computing device 102 can obtain cellular network data 116 and one or more usage models 130. According to various embodiments of the concepts and technologies disclosed herein, the usage models 130 obtained in operation 402 (if obtained), can correspond to the cellular network data 116. For example, the computing device 102 can identify a user equipment 118 associated with the cellular network data 116, and can identify a usage model 130 associated with the user equipment 118 identified. It should be understood that this example is illustrative, and therefore should not be construed as being limiting in any way.

As explained herein, the data obtained in operation 402 can be obtained by the computing device in response to generating a request 128 for cellular network data 116, in response to an end of a time interval associated with the request 128, in response to sending a radio resource control message 122 to the user equipment 118 (e.g., by receiving a report 124 in response to the radio resource control message 122), in response to expiration of a time interval associated with the radio resource control message 122, in response to an entity on the cellular network 104 determining that a new instance of cellular network data 116 is available, and/or based on other trigger events as illustrated and described herein. Because the data can be obtained in operation 402 in additional and/or alternative manners, it should be understood that these examples are illustrative, and therefore should not be construed as being limiting in any way.

From operation 402, the method 400 can proceed to operation 404. At operation 404, the computing device 102 can analyze the cellular network data 116 obtained in operation 402. Thus, it can be appreciated that operation 404 can correspond to the computing device 102 analyzing the cellular network data 116 obtained in operation 402. From the above description, it can be understood that the cellular network data 116 obtained in operation 402 can reflect operating conditions of the user equipment 118 and the cellular network 104, as well as needs of the user equipment 118 and the cellular network 104. Thus, the analysis of the cellular network data 116 can include determining the needs of the cellular network 104 and the user equipment 118, as well as determining the operating characteristics of the cellular network 104 and the user equipment 118. In some embodiments, operation 404 also can include the computing device 102 analyzing one or more usage models 130 associated with the cellular network data 116.

As explained herein, the computing device 102 can analyze the cellular network data 116 and usage models 130 (if obtained) to determine if any connection parameters should be manipulated. In particular, the computing device 102 can identify, from the cellular network data 116, one or more connections used by a user equipment 118 to communicate with the cellular network 104, and can determine various aspect of those connections and/or the user equipment 118 such as, for example, connection aspects (connection bandwidth, connection uplink speed, connection downlink speed, connection utilization, connection latency, connection jitter, etc.), network resource availability, signal load information, quality of service of the connection, configuration information, environmental data, temperature data, and/or other information associated with the user equipment 118 and/or the connection used by the user equipment 118.

The computing device 102 can determine, based on the data obtained, if a parameter that defines any aspect of the connections associated with the user equipment 118 should be manipulated. For example, the computing device 102 can determine if a battery usage or battery level of the user equipment 118 indicates that a connection parameter should be manipulated (e.g., to preserve battery life); if a connection speed of a connection of the user equipment 118 indicates that a connection parameter should be manipulated (e.g., to preserve power and/or to release unused resources); if a location associated with the user equipment 118 indicates that a connection parameter should be manipulated (e.g., to delay or accelerate a handoff, to capture or release resources, etc.); if a voice connection should be dropped, e.g., to release unused voice channel resources; or the like.

Thus, in operation 404, the computing device 102 can determine if the connection resources associated with the user equipment 118 are being used in an optimal manner, or if some connection parameter should be adjusted to make the usage optimal (or to improve the usage). Operation 404 therefore can also include the computing device 102 identifying a connection parameter associated with a particular aspect of the connections associated with the user equipment 118. For example, the computing device 102 can identify a parameter that controls a connection speed of the connection; a handoff scheduling associated with a cell 120 and/or a connection; a resource allocation parameter; a voice channel allocation parameter; combinations thereof; or the like. Because other parameters and/or other connection aspects are possible, contemplated, and have been illustrated and described herein, it should be understood that these examples are illustrative, and therefore should not be construed as being limiting in any way.

From operation 404, the method 400 can proceed to operation 406. At operation 406, the computing device 102 can identify the connection parameters to manipulate. As noted above with reference to operation 404, the computing device 102 can identify one or more parameters that define various aspects of the connections associated with the user equipment 118. Operation 406 also can include the computing device 102 determining how to manipulate the connection parameters identified in operation 406. For example, if connection speed associated with a connection is to be changed, operation 406 can include the computing device 102 identifying a parameter that controls connection speed of the connection, as well as determining a value to change that parameter to during the manipulation. Thus, operation 406 can include not only identifying parameters, but identifying new settings or values of the parameters identified. It should be understood that this example is illustrative, and therefore should not be construed as being limiting in any way.

From operation 406, the method 400 can proceed to operation 408. At operation 408, the computing device 102 can issue one or more commands 132 to one or more devices. Operation 408 can include the computing device 102 generating commands 132 to make the manipulations to the identified parameters, as well as sending the generated commands 132 to the appropriate devices. In some embodiments, the commands 132 can be issued to the cellular network management entity 112, which can implement the commands 132 to manipulate the parameters, in some embodiments. In some other embodiments, the commands 132 can be issued to the user equipment 118 to cause the user equipment 118 to modify its operation and/or some aspect of the connection. In some other embodiments, the commands 132 can be issued to other entities to manipulate the connection parameters as determined in operation 406. Thus, performance of operation 408 can trigger the manipulation of the connection parameters as illustrated and described herein.

From operation 408, the method 400 can proceed to operation 410. At operation 410, the computing device 102 can perform reporting and learning. In operation 410, the computing device 102 can learn from the performance of the method 400 (and/or similar methods or procedures) to create and/or update the usage models 130, to report results of the method 400 (e.g., the manipulation of the connection parameters), and/or to perform learning for future improvement on the manipulation of connection parameters.

Thus, in operation 410 the computing device 102 can create a data entry that can capture the condition of the connection that was to be changed, as well as a parameter that is associated with that condition and a value of the parameter as modified, for example. Other connection parameter manipulations can be represented in a similar manner in the learning and reporting, and usage models 130 can be created or updated to reflect usage of the connections associated with the connection parameter manipulation effected by performance of the method 400. Because other learning and reporting are possible and are contemplated, it should be understood that these examples are illustrative, and therefore should not be construed as being limiting in any way.

From operation 410, the method 400 can proceed to operation 412. The method 400 can end at operation 412.

Figure 5:
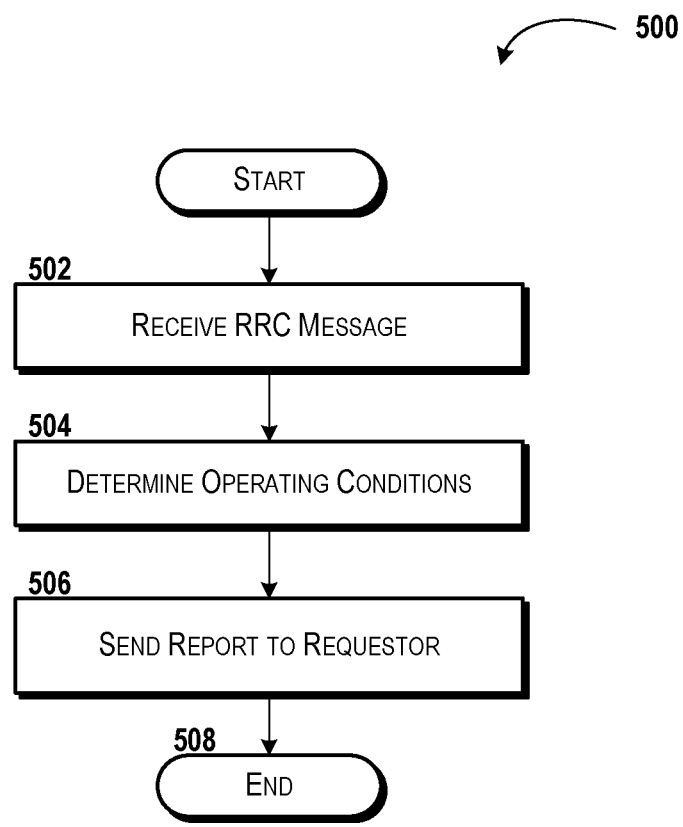
FIG. 5 is a flow diagram showing aspects of a method for providing reports to a cellular network, according to an illustrative embodiment of the concepts and technologies described herein.

Turning now to FIG. 5, aspects of a method 500 for providing reports 124 to a cellular network 104 will be described in detail, according to an illustrative embodiment. For purposes of illustrating and describing the concepts of the present disclosure, the method 500 is described herein as being performed by the user equipment 118 via execution of one or more software modules such as, for example, the parameter application 126. It should be understood that additional and/or alternative devices and/or network nodes can provide the functionality described herein via execution of one or more modules, applications, and/or other software including, but not limited to, the parameter application 126. Thus, the illustrated embodiments are illustrative, and should not be viewed as being limiting in any way.

The method 500 begins at operation 502. At operation 502, the user equipment 118 can receive a radio resource control message 122. In some embodiments, the radio resource control message 122 can be received by the user equipment 118 when the user equipment 118 first attaches to the cellular network 104. In some other embodiments, the radio resource control message 122 can be received by the user equipment 118 at other times (e.g., when a handoff occurs, when a change is to be made to a connection, when the user equipment 118 moves, etc.). Thus, it can be appreciated that operation 502 can be performed at almost any time.

As illustrated and described herein, the radio resource control messages 122 used in embodiments of the concepts and technologies disclosed herein can include requests for various operating conditions at the user equipment 118 such as, for example, battery level, connection aspects (e.g., speed, latency, bandwidth, usage, jitter, etc.), temperature information (e.g., air temperature at the user equipment 118, temperature inside the user equipment 118, temperature at a component of the user equipment 118, etc.), usage information (e.g., resource usage by the user equipment 118), location information (e.g., a location at which the user equipment 118 is located, a location to which the user equipment 118 is moving, etc.), other information, or the like.

From operation 502, the method 500 can proceed to operation 504. At operation 504, the user equipment 118 can determine one or more operating conditions at the user equipment 118. It can be appreciated that the operating conditions determined by the user equipment 118 in operation 504 can correspond to the operating conditions identified in the radio resource control message 122 received in operation 502. It also can be appreciated, as explained above, that the radio resource control message 122 can define one or more time intervals. These time intervals can, when expired, prompt the user equipment 118 to send a report 124 that can include the operation conditions specified in the radio resource control message 122. Thus, a single radio resource control message 122 can prompt the user equipment 118 to generate one or more than one report 124.

From operation 504, the method 500 can proceed to operation 506. At operation 506, the user equipment 118 can send the report 124 to the requestor. As noted above, it should be understood that in various embodiments of the concepts and technologies disclosed herein, operations 504-506 may be repeated multiple times in response to receiving only one radio resource control message 122. Thus, while FIG. 5 does not show the repeating of operations 504-506, it should be understood that these operations can repeat for a defined number of cycles, or forever until stopped. It should be understood that this example is illustrative, and therefore should not be construed as being limiting in any way.

From operation 506, the method 500 can proceed to operation 508. The method 500 can end at operation 508.

Figure 6:
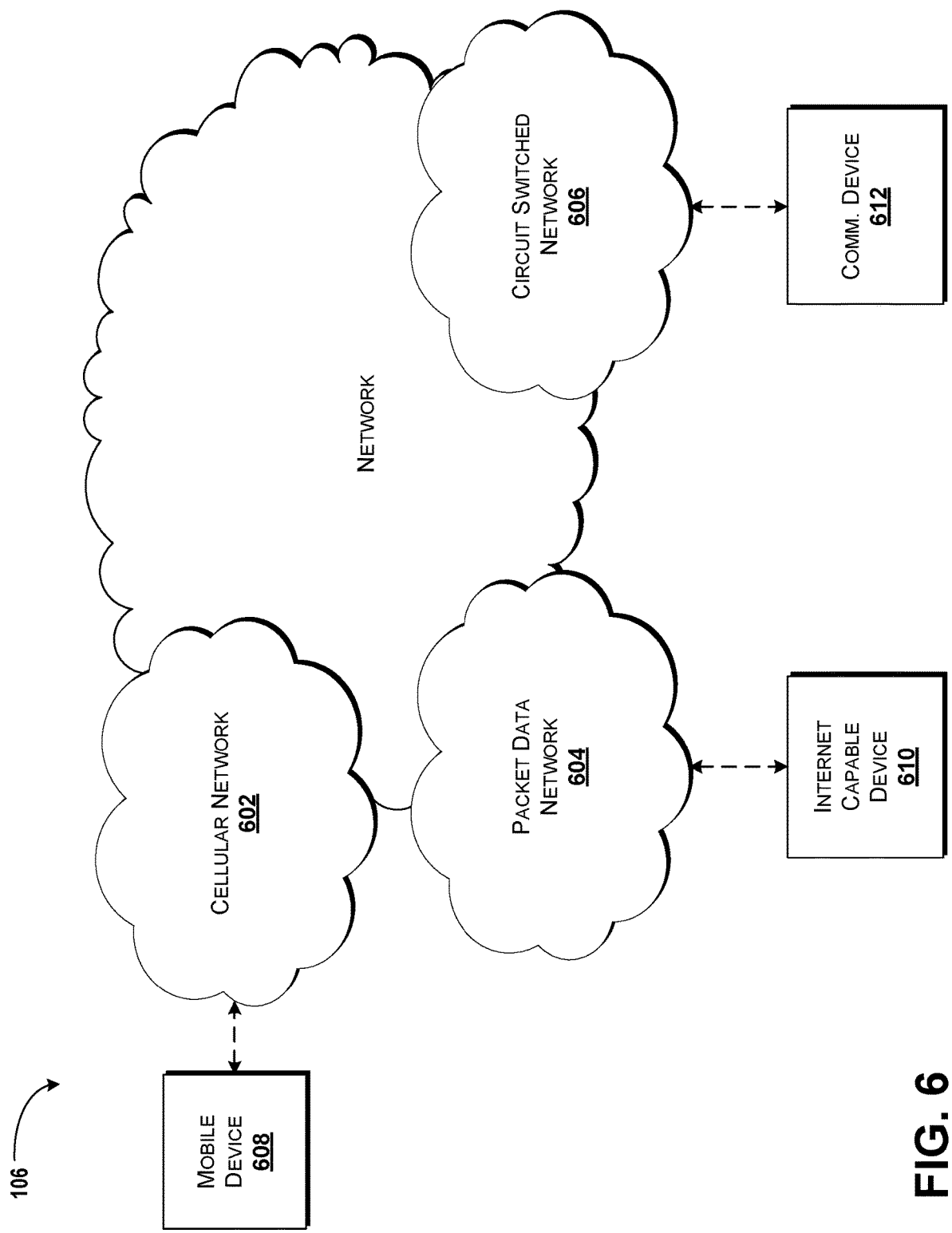
FIG. 6 schematically illustrates a network, according to an illustrative embodiment of the concepts and technologies described herein.

Turning now to FIG. 6, additional details of the network 106 are illustrated, according to an illustrative embodiment. The network 106 includes a cellular network 602, a packet data network 604, for example, the Internet, and a circuit switched network 606, for example, a publicly switched telephone network ("PSTN"). The cellular network 602 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 602 also includes radios and nodes for receiving and transmitting voice, data, and combinations thereof to and from radio transceivers, networks, the packet data network 604, and the circuit switched network 606.

A mobile communications device 608, such as, for example, a cellular telephone, a user equipment, a mobile terminal, a PDA, a laptop computer, a handheld computer, and combinations thereof, can be operatively connected to the cellular network 602. The cellular network 602 can be configured as a 2G GSM network and can provide data communications via GPRS and/or EDGE. Additionally, or alternatively, the cellular network 602 can be configured as a 3G UMTS network and can provide data communications via the HSPA protocol family, for example, HSDPA, EUL (also referred to as HSDPA), and HSPA+. The cellular network 602 also is compatible with 4G, 4.5G, and 5G mobile communications standards, as well as evolved and future mobile standards.

The packet data network 604 includes various devices, for example, servers, computers, databases, and other devices in communication with one another, as is generally known. The packet data network 604 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 604 includes or is in communication with the Internet. The circuit switched network 606 includes various hardware and software for providing circuit switched communications. The circuit switched network 606 may include, or may be, what is often referred to as a plain old telephone system (POTS). The functionality of a circuit switched network 606 or other circuit-switched network are generally known and will not be described herein in detail.

The illustrated cellular network 602 is shown in communication with the packet data network 604 and a circuit switched network 606, though it should be appreciated that this is not necessarily the case. One or more Internet-capable devices 610, for example, a PC, a laptop, a portable device, or another suitable device, can communicate with one or more cellular networks 602, and devices connected thereto, through the packet data network 604. It also should be appreciated that the Internet-capable device 610 can communicate with the packet data network 604 through the circuit switched network 606, the cellular network 602, and/or via other networks (not illustrated).

As illustrated, a communications device 612, for example, a telephone, facsimile machine, modem, computer, or the like, can be in communication with the circuit switched network 606, and therethrough to the packet data network 604 and/or the cellular network 602. It should be appreciated that the communications device 612 can be an Internet-capable device, and can be substantially similar to the Internet-capable device 610. In the specification, the network 106 is used to refer broadly to any combination of the networks 602, 604, 606. It should be appreciated that substantially all of the functionality described with reference to the network 106 can be performed by the cellular network 602, the packet data network 604, and/or the circuit switched network 606, alone or in combination with other networks, network elements, and the like.

Figure 7:
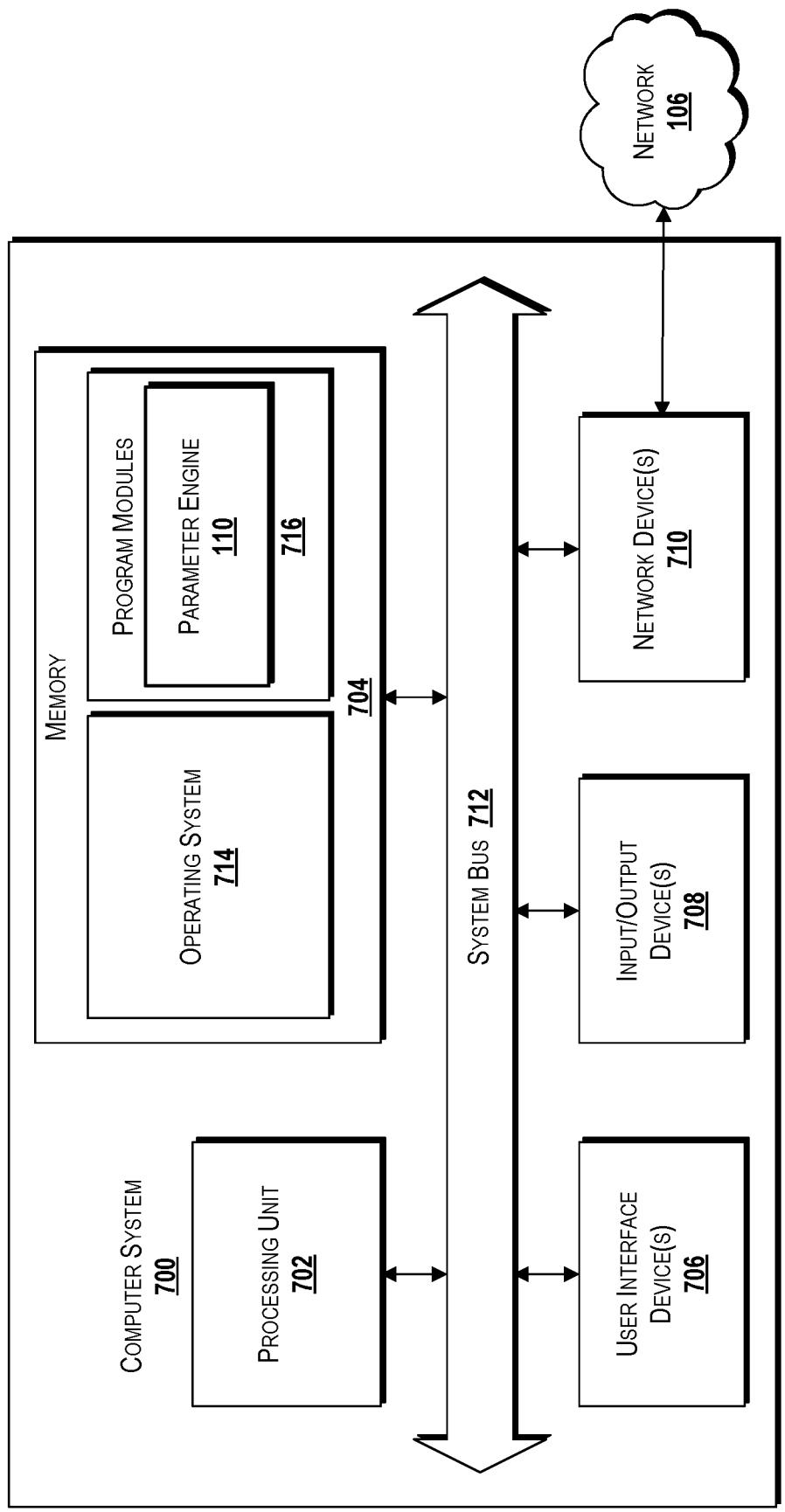
FIG. 7 is a block diagram illustrating an example computer system configured to provide event triggered network parameter manipulation, according to some illustrative embodiments of the concepts and technologies described herein.

FIG. 7 is a block diagram illustrating a computer system 700 configured to provide the functionality described herein for event triggered network parameter manipulation, in accordance with various embodiments of the concepts and technologies disclosed herein. The computer system 700 includes a processing unit 702, a memory 704, one or more user interface devices 706, one or more input/output ("I/O") devices 708, and one or more network devices 710, each of which is operatively connected to a system bus 712. The bus 712 enables bi-directional communication between the processing unit 702, the memory 704, the user interface devices 706, the I/O devices 708, and the network devices 710.

The processing unit 702 may be a standard central processor that performs arithmetic and logical operations, a more specific purpose programmable logic controller ("PLC"), a programmable gate array, or other type of processor known to those skilled in the art and suitable for controlling the operation of the server computer. As used herein, the word "processor" and/or the phrase "processing unit" when used with regard to any architecture or system can include multiple processors or processing units distributed across and/or operating in parallel in a single machine or in multiple machines. Furthermore, processors and/or processing units can be used to support virtual processing environments. Processors and processing units also can include state machines, application-specific integrated circuits ("ASICs"), combinations thereof, or the like. Because processors and/or processing units are generally known, the processors and processing units disclosed herein will not be described in further detail herein.

The memory 704 communicates with the processing unit 702 via the system bus 712. In some embodiments, the memory 704 is operatively connected to a memory controller (not shown) that enables communication with the processing unit 702 via the system bus 712. The memory 704 includes an operating system 714 and one or more program modules 716. The operating system 714 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 716 may include various software and/or program modules described herein. In some embodiments, for example, the program modules 716 can include the parameter engine 110. This and/or other programs can be embodied in computer-readable media containing instructions that, when executed by the processing unit 702, perform one or more of the methods 200, 300, 400, and 500 described in detail above with respect to FIGS. 2, 3, 4, and 5 and/or other functionality as illustrated and described herein. It can be appreciated that, at least by virtue of the instructions embodying the methods 200, 300, 400, and 500 and/or other functionality illustrated and described herein being stored in the memory 704 and/or accessed and/or executed by the processing unit 702, the computer system 700 is a special-purpose computing system that can facilitate providing the functionality illustrated and described herein. According to embodiments, the program modules 716 may be embodied in hardware, software, firmware, or any combination thereof. Although not shown in FIG. 7, it should be understood that the memory 704 also can be configured to store the cellular network data 116, the radio resource control messages 122, the usage models 130, the commands 132, and/or other data, if desired.

By way of example, and not limitation, computer-readable media may include any available computer storage media or communication media that can be accessed by the computer system 700. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes only non-transitory embodiments of computer readable media as illustrated and described herein. Thus, computer storage media can include volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 700. In the claims, the phrase "computer storage medium" and variations thereof does not include waves or signals per se and/or communication media.

The user interface devices 706 may include one or more devices with which a user accesses the computer system 700. The user interface devices 706 may include, but are not limited to, computers, servers, personal digital assistants, cellular phones, or any suitable computing devices. The I/O devices 708 enable a user to interface with the program modules 716. In one embodiment, the I/O devices 708 are operatively connected to an I/O controller (not shown) that enables communication with the processing unit 702 via the system bus 712. The I/O devices 708 may include one or more input devices, such as, but not limited to, a keyboard, a mouse, or an electronic stylus. Further, the I/O devices 708 may include one or more output devices, such as, but not limited to, a display screen or a printer.

The network devices 710 enable the computer system 700 to communicate with other networks or remote systems via a network, such as the network 106. Examples of the network devices 710 include, but are not limited to, a modem, a radio frequency ("RF") or infrared ("IR") transceiver, a telephonic interface, a bridge, a router, or a network card. The network 106 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 106 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Figure 8:
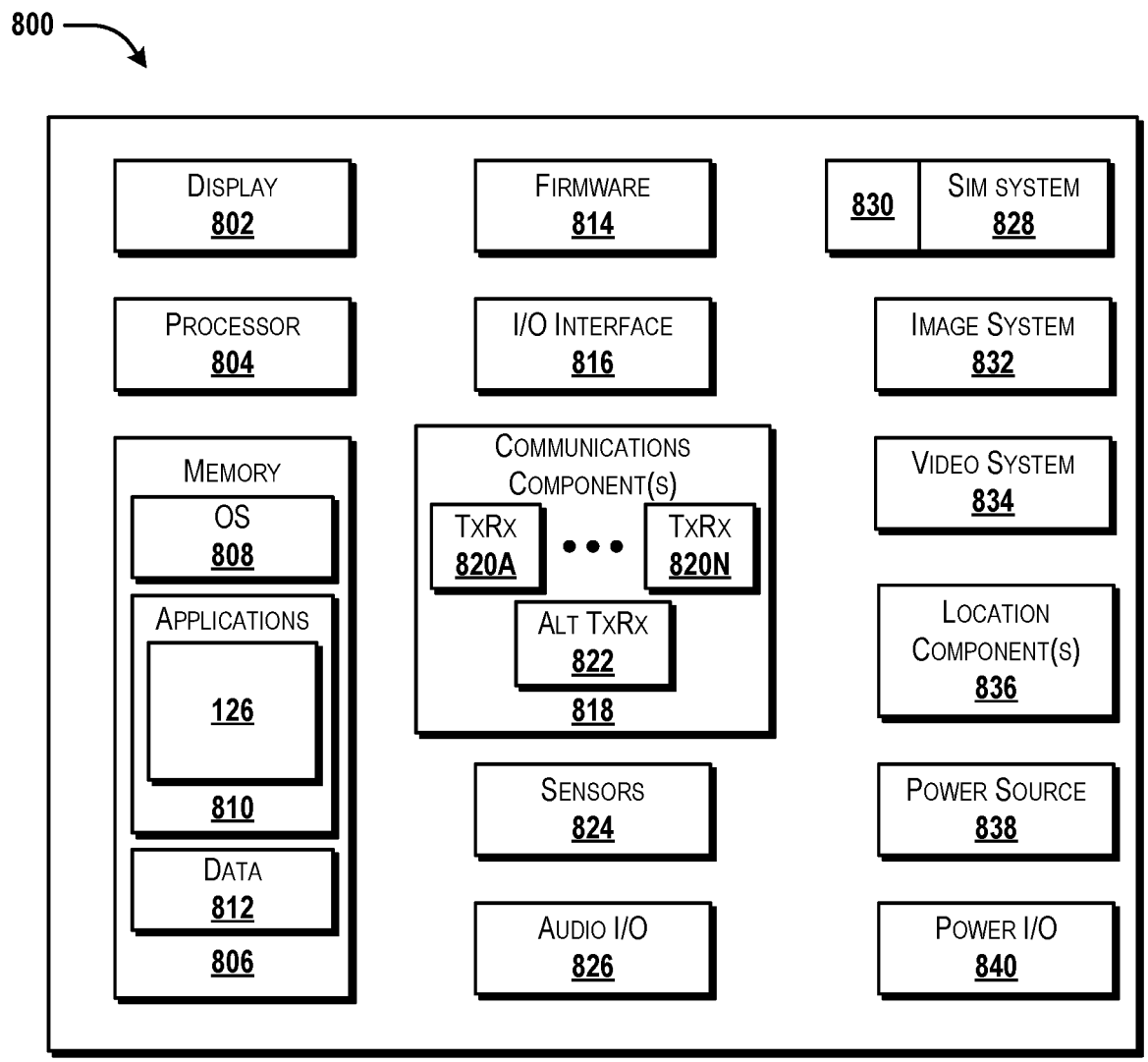
FIG. 8 is a block diagram illustrating an example mobile device configured to interact with a parameter engine, according to some illustrative embodiments of the concepts and technologies described herein.

Turning now to FIG. 8, an illustrative mobile device 800 and components thereof will be described. In some embodiments, the user equipment 118 described herein can be configured as and/or can have an architecture similar or identical to the mobile device 800 described herein in FIG. 8. It should be understood, however, that the user equipment 118 may or may not include the functionality described herein with reference to FIG. 8. While connections are not shown between the various components illustrated in FIG. 8, it should be understood that some, none, or all of the components illustrated in FIG. 8 can be configured to interact with one another to carry out various device functions. In some embodiments, the components are arranged so as to communicate via one or more buses (not shown). Thus, it should be understood that FIG. 8 and the following description are intended to provide a general understanding of a suitable environment in which various aspects of embodiments can be implemented, and should not be construed as being limiting in any way.

As illustrated in FIG. 8, the mobile device 800 can include a display 802 for displaying data. According to various embodiments, the display 802 can be configured to display various graphical user interface ("GUI") elements such as, for example, text, images, video, virtual keypads and/or keyboards, messaging data, notification messages, metadata, internet content, device status, time, date, calendar data, device preferences, map and location data, combinations thereof, and/or the like. The mobile device 800 also can include a processor 804 and a memory or other data storage device ("memory") 806. The processor 804 can be configured to process data and/or can execute computer-executable instructions stored in the memory 806. The computer-executable instructions executed by the processor 804 can include, for example, an operating system 808, one or more applications 810 such as the parameter application 126, other computer-executable instructions stored in a memory 806, or the like. In some embodiments, the applications 810 also can include a UI application (not illustrated in FIG. 8).

The UI application can interface with the operating system 808, to facilitate user interaction with functionality and/or data stored at the mobile device 800 and/or stored elsewhere. In some embodiments, the operating system 808 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 804 to aid a user in entering content, configuring settings, manipulating address book content and/or settings, multi-mode interaction, interacting with other applications 810, and otherwise facilitating user interaction with the operating system 808, the applications 810, and/or other types or instances of data 812 that can be stored at the mobile device 800. The data 812 can include, for example, the parameter engine 110, the cellular network data 116, the radio resource control messages 122, the usage models 130, the commands 132 and/or other applications, program modules, or data. According to various embodiments, the data 812 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 810, the data 812, and/or portions thereof can be stored in the memory 806 and/or in a firmware 814, and can be executed by the processor 804.

It can be appreciated that, at least by virtue of storage of the instructions corresponding to the applications 810 and/or other instructions embodying other functionality illustrated and described herein in the memory 806, and/or by virtue of the instructions corresponding to the applications 810 and/or other instructions embodying other functionality illustrated and described herein being accessed and/or executed by the processor 804, the mobile device 800 is a special-purpose mobile device that can facilitate providing the functionality illustrated and described herein. The firmware 814 also can store code for execution during device power up and power down operations. It can be appreciated that the firmware 814 can be stored in a volatile or non-volatile data storage device including, but not limited to, the memory 806 and/or a portion thereof.

The mobile device 800 also can include an input/output ("I/O") interface 816. The I/O interface 816 can be configured to support the input/output of data such as location information, radio resource control messages 122, reports 124, user information, organization information, presence status information, user IDs, passwords, and application initiation (start-up) requests. In some embodiments, the I/O interface 816 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45 or RJ48) port, a telephone (RJ11 or the like) port, a proprietary port, combinations thereof, or the like.

In some embodiments, the mobile device 800 can be configured to synchronize with another device to transfer content to and/or from the mobile device 800. In some embodiments, the mobile device 800 can be configured to receive updates to one or more of the applications 810 via the I/O interface 816, though this is not necessarily the case. In some embodiments, the I/O interface 816 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 816 may be used for communications between the mobile device 800 and a network device or local device.

The mobile device 800 also can include a communications component 818. The communications component 818 can be configured to interface with the processor 804 to facilitate wired and/or wireless communications with one or more networks such as the network 106 and/or the cellular network 104 described herein. In some embodiments, other networks include networks that utilize non-cellular wireless technologies such as WI-FI or WIMAX. In some embodiments, the communications component 818 includes a multimode communications subsystem for facilitating communications via the cellular network and one or more other networks.

The communications component 818, in some embodiments, includes one or more transceivers. The one or more transceivers, if included, can be configured to communicate over the same and/or different wireless technology standards with respect to one another. For example, in some embodiments one or more of the transceivers of the communications component 818 may be configured to communicate using GSM, CDMAONE, CDMA2000, LTE, and various other 2G, 2.5G, 3G, 4G, and greater generation technology standards. Moreover, the communications component 818 may facilitate communications over various channel access methods (which may or may not be used by the aforementioned standards) including, but not limited to, TDMA, FDMA, W-CDMA, OFDM, SDMA, and the like.

In addition, the communications component 818 may facilitate data communications using GPRS, EDGE, the HSPA protocol family including HSDPA, EUL or otherwise termed HSDPA, HSPA+, and various other current and future wireless data access standards. In the illustrated embodiment, the communications component 818 can include a first transceiver ("TxRx") 820A that can operate in a first communications mode (e.g., GSM). The communications component 818 also can include an $N^{th}$ transceiver ("TxRx") 820N that can operate in a second communications mode relative to the first transceiver 820A (e.g., UMTS). While two transceivers 820A-N (hereinafter collectively and/or generically referred to as "transceivers 820") are shown in FIG. 8, it should be appreciated that less than two, two, and/or more than two transceivers 820 can be included in the communications component 818.

The communications component 818 also can include an alternative transceiver ("Alt TxRx") 822 for supporting other types and/or standards of communications. According to various contemplated embodiments, the alternative transceiver 822 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 818 also can facilitate reception from terrestrial radio networks, digital satellite radio networks, internet-based radio service networks, combinations thereof, and the like. The communications component 818 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 800 also can include one or more sensors 824. The sensors 824 can include temperature sensors, light sensors, air quality sensors, movement sensors, orientation sensors, noise sensors, proximity sensors, or the like. As such, it should be understood that the sensors 824 can include, but are not limited to, accelerometers, magnetometers, gyroscopes, infrared sensors, noise sensors, microphones, combinations thereof, or the like. Additionally, audio capabilities for the mobile device 800 may be provided by an audio I/O component 826. The audio I/O component 826 of the mobile device 800 can include one or more speakers for the output of audio signals, one or more microphones for the collection and/or input of audio signals, and/or other audio input and/or output devices.

The illustrated mobile device 800 also can include a subscriber identity module ("SIM") system 828. The SIM system 828 can include a universal SIM ("USIM"), a universal integrated circuit card ("UICC") and/or other identity devices. The SIM system 828 can include and/or can be connected to or inserted into an interface such as a slot interface 830. In some embodiments, the slot interface 830 can be configured to accept insertion of other identity cards or modules for accessing various types of networks. Additionally, or alternatively, the slot interface 830 can be configured to accept multiple subscriber identity cards. Because other devices and/or modules for identifying users and/or the mobile device 800 are contemplated, it should be understood that these embodiments are illustrative, and should not be construed as being limiting in any way.

The mobile device 800 also can include an image capture and processing system 832 ("image system"). The image system 832 can be configured to capture or otherwise obtain photos, videos, and/or other visual information. As such, the image system 832 can include cameras, lenses, charge-coupled devices ("CCDs"), combinations thereof, or the like. The mobile device 800 may also include a video system 834. The video system 834 can be configured to capture, process, record, modify, and/or store video content. Photos and videos obtained using the image system 832 and the video system 834, respectively, may be added as message content to an MMS message, email message, and sent to another mobile device. The video and/or photo content also can be shared with other devices via various types of data transfers via wired and/or wireless communication devices as described herein.

The mobile device 800 also can include one or more location components 836. The location components 836 can be configured to send and/or receive signals to determine a geographic location of the mobile device 800. According to various embodiments, the location components 836 can send and/or receive signals from global positioning system ("GPS") devices, assisted-GPS ("A-GPS") devices, WI-FI/WIMAX and/or cellular network triangulation data, combinations thereof, and the like. The location component 836 also can be configured to communicate with the communications component 818 to retrieve triangulation data for determining a location of the mobile device 800. In some embodiments, the location component 836 can interface with cellular network nodes, telephone lines, satellites, location transmitters and/or beacons, wireless network transmitters and receivers, combinations thereof, and the like. In some embodiments, the location component 836 can include and/or can communicate with one or more of the sensors 824 such as a compass, an accelerometer, and/or a gyroscope to determine the orientation of the mobile device 800. Using the location component 836, the mobile device 800 can generate and/or receive data to identify its geographic location, or to transmit data used by other devices to determine the location of the mobile device 800. The location component 836 may include multiple components for determining the location and/or orientation of the mobile device 800.

The illustrated mobile device 800 also can include a power source 838. The power source 838 can include one or more batteries, power supplies, power cells, and/or other power subsystems including alternating current ("AC") and/or direct current ("DC") power devices. The power source 838 also can interface with an external power system or charging equipment via a power I/O component 840. Because the mobile device 800 can include additional and/or alternative components, the above embodiment should be understood as being illustrative of one possible operating environment for various embodiments of the concepts and technologies described herein. The described embodiment of the mobile device 800 is illustrative, and should not be construed as being limiting in any way.

Figure 9:
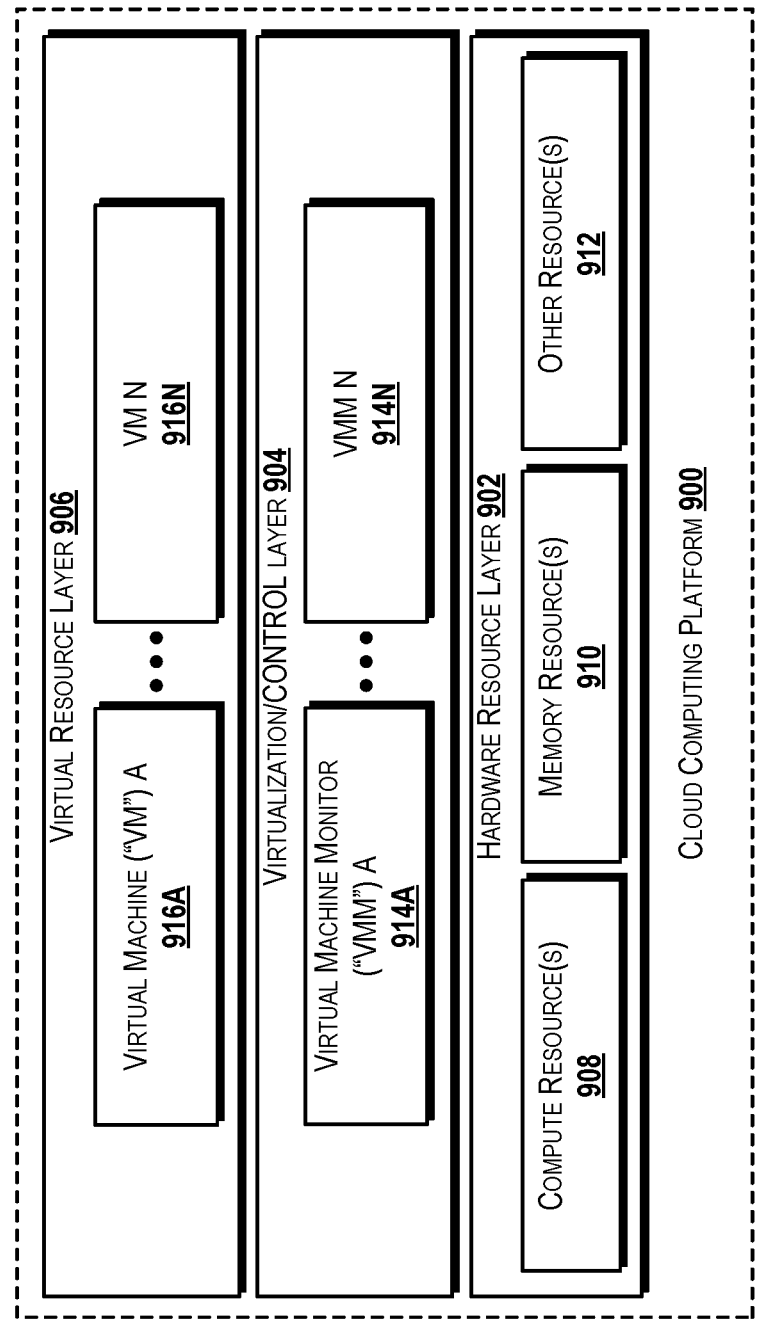
FIG. 9 is a diagram illustrating a computing environment capable of implementing aspects of the concepts and technologies disclosed herein, according to some illustrative embodiments of the concepts and technologies described herein.

FIG. 9 illustrates an illustrative architecture for a cloud computing platform 900 that can be capable of executing the software components described herein for event triggered network parameter manipulation and/or for interacting with the parameter engine 110. Thus, it can be appreciated that in some embodiments of the concepts and technologies disclosed herein, the cloud computing platform 900 illustrated in FIG. 9 can be used to provide the functionality described herein with respect to the computing device 102, the cellular network management entity 112, and/or other devices illustrated and described herein.

The cloud computing platform 900 thus may be utilized to execute any aspects of the software components presented herein. Thus, according to various embodiments of the concepts and technologies disclosed herein, the parameter engine 110, the cellular network management entity 112, and/or the parameter application 126 can be implemented, at least in part, on or by elements included in the cloud computing platform 900 illustrated and described herein. Those skilled in the art will appreciate that the illustrated cloud computing platform 900 is a simplification of but only one possible implementation of an illustrative cloud computing platform, and as such, the illustrated cloud computing platform 900 should not be construed as being limiting in any way.

In the illustrated embodiment, the cloud computing platform 900 can include a hardware resource layer 902, a virtualization/control layer 904, and a virtual resource layer 906. These layers and/or other layers can be configured to cooperate with each other and/or other elements of a cloud computing platform 900 to perform operations as will be described in detail herein. While connections are shown between some of the components illustrated in FIG. 9, it should be understood that some, none, or all of the components illustrated in FIG. 9 can be configured to interact with one another to carry out various functions described herein. In some embodiments, the components are arranged so as to communicate via one or more networks such as, for example, the network 106 illustrated and described hereinabove (not shown in FIG. 9). Thus, it should be understood that FIG. 9 and the following description are intended to provide a general understanding of a suitable environment in which various aspects of embodiments can be implemented, and should not be construed as being limiting in any way.

The hardware resource layer 902 can provide hardware resources. In the illustrated embodiment, the hardware resources can include one or more compute resources 908, one or more memory resources 910, and one or more other resources 912. The compute resource(s) 908 can include one or more hardware components that can perform computations to process data, and/or to execute computer-executable instructions of one or more application programs, operating systems, services, and/or other software including, but not limited to, the parameter engine 110, the parameter application 126, and/or other software illustrated and described herein.

According to various embodiments, the compute resources 908 can include one or more central processing units ("CPUs"). The CPUs can be configured with one or more processing cores. In some embodiments, the compute resources 908 can include one or more graphics processing units ("GPUs"). The GPUs can be configured to accelerate operations performed by one or more CPUs, and/or to perform computations to process data, and/or to execute computer-executable instructions of one or more application programs, operating systems, and/or other software that may or may not include instructions that are specifically graphics computations and/or related to graphics computations. In some embodiments, the compute resources 908 can include one or more discrete GPUs. In some other embodiments, the compute resources 908 can include one or more CPU and/or GPU components that can be configured in accordance with a co-processing CPU/GPU computing model. Thus, it can be appreciated that in some embodiments of the compute resources 908, a sequential part of an application can execute on a CPU and a computationally-intensive part of the application can be accelerated by the GPU. It should be understood that this example is illustrative, and therefore should not be construed as being limiting in any way.

In some embodiments, the compute resources 908 also can include one or more system on a chip ("SoC") components. It should be understood that an SoC component can operate in association with one or more other components as illustrated and described herein, for example, one or more of the memory resources 910 and/or one or more of the other resources 912. In some embodiments in which an SoC component is included, the compute resources 908 can be or can include one or more embodiments of the SNAPDRAGON brand family of SoCs, available from QUALCOMM of San Diego, Calif.; one or more embodiment of the TEGRA brand family of SoCs, available from NVIDIA of Santa Clara, Calif.; one or more embodiment of the HUMMINGBIRD brand family of SoCs, available from SAMSUNG of Seoul, South Korea; one or more embodiment of the Open Multimedia Application Platform ("OMAP") family of SoCs, available from TEXAS INSTRUMENTS of Dallas, Tex.; one or more customized versions of any of the above SoCs; and/or one or more other brand and/or one or more proprietary SoCs.

The compute resources 908 can be or can include one or more hardware components arranged in accordance with an ARM architecture, available for license from ARM HOLDINGS of Cambridge, United Kingdom. Alternatively, the compute resources 908 can be or can include one or more hardware components arranged in accordance with an x86 architecture, such as an architecture available from INTEL CORPORATION of Mountain View, Calif., and others. Those skilled in the art will appreciate the implementation of the compute resources 908 can utilize various computation architectures and/or processing architectures. As such, the various example embodiments of the compute resources 908 as mentioned hereinabove should not be construed as being limiting in any way. Rather, implementations of embodiments of the concepts and technologies disclosed herein can be implemented using compute resources 908 having any of the particular computation architecture and/or combination of computation architectures mentioned herein as well as other architectures.

Although not separately illustrated in FIG. 9, it should be understood that the compute resources 908 illustrated and described herein can host and/or execute various services, applications, portals, and/or other functionality illustrated and described herein. Thus, the compute resources 908 can host and/or can execute the parameter engine 110, the cellular network management entity 112, the parameter application 126, or other applications or services illustrated and described herein.

The memory resource(s) 910 can include one or more hardware components that can perform or provide storage operations, including temporary and/or permanent storage operations. In some embodiments, the memory resource(s) 910 can include volatile and/or non-volatile memory implemented in any method or technology for storage of information such as computer-readable instructions, data structures, program modules, or other data disclosed herein. Computer storage media is defined hereinabove and therefore should be understood as including, in various embodiments, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium that can be used to store data and that can be accessed by the compute resources 908, subject to the definition of "computer storage media" provided above (e.g., as excluding waves and signals per se and/or communication media as defined in this application).

Although not illustrated in FIG. 9, it should be understood that the memory resources 910 can host or store the various data illustrated and described herein including, but not limited to, the cellular network data 116, the radio resource control messages 122, the usage models 130, the commands 132, and/or other data, if desired. It should be understood that this example is illustrative, and therefore should not be construed as being limiting in any way.

The other resource(s) 912 can include any other hardware resources that can be utilized by the compute resources(s) 908 and/or the memory resource(s) 910 to perform operations. The other resource(s) 912 can include one or more input and/or output processors (e.g., a network interface controller and/or a wireless radio), one or more modems, one or more codec chipsets, one or more pipeline processors, one or more fast Fourier transform ("FFT") processors, one or more digital signal processors ("DSPs"), one or more speech synthesizers, combinations thereof, or the like.

The hardware resources operating within the hardware resource layer 902 can be virtualized by one or more virtual machine monitors ("VMMs") 914A-914N (also known as "hypervisors;" hereinafter "VMMs 914"). The VMMs 914 can operate within the virtualization/control layer 904 to manage one or more virtual resources that can reside in the virtual resource layer 906. The VMMs 914 can be or can include software, firmware, and/or hardware that alone or in combination with other software, firmware, and/or hardware, can manage one or more virtual resources operating within the virtual resource layer 906.

The virtual resources operating within the virtual resource layer 906 can include abstractions of at least a portion of the compute resources 908, the memory resources 910, the other resources 912, or any combination thereof. These abstractions are referred to herein as virtual machines ("VMs"). In the illustrated embodiment, the virtual resource layer 906 includes VMs 916A-916N (hereinafter "VMs 916").

Based on the foregoing, it should be appreciated that systems and methods for providing event triggered network parameter manipulation have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A system comprising:
a processor; and
a memory that stores computer-executable instructions that, when executed by the processor, cause the processor to perform operations comprising
detecting a trigger to collect data associated with a connection between a user equipment and a cellular network;
triggering delivery of a radio resource control message to the user equipment by the cellular network;
receiving, from the user equipment, a report that is generated by the user equipment in response to receiving the radio resource control message, the report comprising operational data associated with the user equipment;
obtaining data from the cellular network, wherein the data from the cellular network comprises the report and operational data associated with the cellular network, wherein the operational data associated with the cellular network comprises connection parameters associated with the connection between the user equipment and the cellular network;
analyzing the data to determine one of the connection parameters that is to be manipulated; and
issuing a command that instructs a recipient of the command to manipulate the one of the connection parameters.

2. The system of claim 1, wherein detecting the trigger comprises receiving a request from a parameter engine.

3. The system of claim 1, wherein detecting the trigger comprises detecting establishment of the connection between the user equipment and the cellular network.

4. The system of claim 1, wherein the data from the cellular network comprises signal load data associated with a cell that supports the connection between the user equipment and the cellular network and the report.

5. The system of claim 4, wherein the report comprises:
battery data that defines battery capacity of the user equipment;
temperature data that defines a temperature associated with the user equipment; and
connection data that defines a communication need associated with the user equipment.

6. The system of claim 1, wherein the radio resource control message comprises a request for the operational data associated with the user equipment.

7. The system of claim 1, wherein analyzing the data to determine one of the connection parameters that is to be manipulated further comprises:
obtaining a usage model associated with the user equipment, wherein the usage model indicates a history of usage of the user equipment; and
analyzing the data and the usage model to determine one of the connection parameters that is to be manipulated.

8. A method comprising:
detecting, at a computing device comprising a processor, a trigger to collect data associated with a connection between a user equipment and a cellular network;
triggering, by the processor, delivery of a radio resource control message to the user equipment by the cellular network;
receiving, by the processor and from the user equipment, a report that is generated by the user equipment in response to receiving the radio resource control message, the report comprising operational data associated with the user equipment;
obtaining, by the processor, data from the cellular network, wherein the data from the cellular network comprises the report and operational data associated with the cellular network, wherein the operational data associated with the cellular network comprises connection parameters associated with the connection between the user equipment and the cellular network;
analyzing, by the processor, the data to determine one of the connection parameters that is to be manipulated; and
issuing, by the processor, a command that instructs a recipient of the command to manipulate the one of the connection parameters.

9. The method of claim 8, wherein detecting the trigger comprises receiving a request from a parameter engine.

10. The method of claim 8, wherein detecting the trigger comprises detecting establishment of the connection between the user equipment and the cellular network.

11. The method of claim 8, wherein the data from the cellular network comprises signal load data associated with a cell that supports the connection between the user equipment and the cellular network and the report.

12. The method of claim 11, wherein the report comprises:
battery data that defines battery capacity of the user equipment;
temperature data that defines a temperature associated with the user equipment; and
connection data that defines a communication need associated with the user equipment.

13. The method of claim 8, wherein the radio resource control message comprises a request for the operational data associated with the user equipment.

14. The method of claim 8, wherein analyzing the data to determine one of the connection parameters that is to be manipulated further comprises:
obtaining a usage model associated with the user equipment, wherein the usage model indicates a history of usage of the user equipment; and
analyzing the data and the usage model to determine one of the connection parameters that is to be manipulated.

15. A computer storage medium having computer-executable instructions stored thereon that, when executed by a processor, cause the processor to perform operations comprising:
detecting a trigger to collect data associated with a connection between a user equipment and a cellular network;
triggering delivery of a radio resource control message to the user equipment by the cellular network;
receiving, from the user equipment, a report that is generated by the user equipment in response to receiving the radio resource control message, the report comprising operational data associated with the user equipment;
obtaining data from the cellular network, wherein the data from the cellular network comprises the report and operational data associated with the cellular network, wherein the operational data associated with the cellular network comprises connection parameters associated with the connection between the user equipment and the cellular network;
analyzing the data to determine one of the connection parameters that is to be manipulated; and
issuing a command that instructs a recipient of the command to manipulate the one of the connection parameters.

16. The computer storage medium of claim 15, wherein detecting the trigger comprises detecting establishment of the connection between the user equipment and the cellular network.

17. The computer storage medium of claim 15, wherein the data from the cellular network comprises signal load data associated with a cell that supports the connection between the user equipment and the cellular network and the report.

18. The computer storage medium of claim 17, wherein the report comprises:
   battery data that defines battery capacity of the user equipment;
   temperature data that defines a temperature associated with the user equipment; and
   connection data that defines a communication need associated with the user equipment.

19. The computer storage medium of claim 15, wherein the radio resource control message comprises a request for the operational data associated with the user equipment.

20. The computer storage medium of claim 15, wherein analyzing the data to determine one of the connection parameters that is to be manipulated further comprises:
   obtaining a usage model associated with the user equipment, wherein the usage model indicates a history of usage of the user equipment; and
   analyzing the data and the usage model to determine one of the connection parameters that is to be manipulated.

* * * * *